United States Patent
Gamm et al.

(10) Patent No.: US 11,611,369 B2
(45) Date of Patent: Mar. 21, 2023

(54) PACKET CORRELATOR FOR A RADIO TRANSMISSION SYSTEM

(71) Applicant: Fraunhofer-Gesellschaft zur Förderung der angewandten Forschung e.V., Munich (DE)

(72) Inventors: Eberhard Gamm, Ebermannstadt (DE); Gerd Kilian, Erlangen (DE); Jakob Kneißl, Erlangen (DE); Josef Bernhard, Erlangen (DE); Markus Siebenhaar, Erlangen (DE)

(73) Assignee: FRAUNHOFER-GESELLSCHAFT ZUR F RDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/069,282

(22) Filed: Oct. 13, 2020

(65) Prior Publication Data
US 2021/0036734 A1 Feb. 4, 2021

Related U.S. Application Data

(63) Continuation of application No. PCT/EP2019/059994, filed on Apr. 17, 2019.

(30) Foreign Application Priority Data

Apr. 20, 2018 (DE) .......................... 102018206137.8

(51) Int. Cl.
*H04B 1/7156* (2011.01)
*H04B 1/06* (2006.01)

(52) U.S. Cl.
CPC ............. *H04B 1/7156* (2013.01); *H04B 1/06* (2013.01); *H04B 2001/71563* (2013.01)

(58) Field of Classification Search
CPC .... H04B 1/7156; H04B 1/713; H04B 1/7143; H04B 1/7136; H04J 13/107; H04L 7/042
See application file for complete search history.

(56) References Cited

U.S. PATENT DOCUMENTS

| | | | |
|---|---|---|---|
| 5,598,429 | A | 1/1997 | Marshall |
| 9,354,081 | B2 | 5/2016 | Bernhard et al. |
| (Continued) | | | |

FOREIGN PATENT DOCUMENTS

| | | |
|---|---|---|
| CN | 1357983 A | 7/2002 |
| CN | 1989724 A | 6/2007 |
| (Continued) | | |

OTHER PUBLICATIONS

G. Kilian et al.: "Increasing Transmission Reliability for Telemetry Systems Using Telegram Splitting," IEEE Transactions on Communications, vol. 63, No. 3, pp. 949-961, Mar. 2015.
G. Kilian et al.: „Improved coverage for low-power telemetry systems using telegram splitting; Proceedings of 2013 European Conference on Smart Objects, Systems and Technologies (SMARTSYSTECH), Jan. 1, 2013, XP002763748.
Yannam Chu, "Office Action for CN Application No. 201980035064.6", dated Aug. 12, 2021, CNIPA, China.
(Continued)

*Primary Examiner* — Aristocratis Fotakis
(74) *Attorney, Agent, or Firm* — Novick, Kim & Lee PLLC; Jae Youn Kim

(57) ABSTRACT

A data receiver is configured to receive a signal including a plurality of partial data packets, wherein the plurality of partial data packets each include part of a data packet, wherein the data receiver includes a multi-stage correlator that is configured to perform multi-stage correlation to detect the partial data packets in the received signal, wherein a second correlation stage of the multi-stage correlator operates based on correlation results of a first correlation stage of the multi-stage correlator.

37 Claims, 21 Drawing Sheets

(56) References Cited

U.S. PATENT DOCUMENTS

| | | |
|---|---|---|
| 2002/0089967 A1 | 7/2002 | Brajal et al. |
| 2004/0032825 A1 | 2/2004 | Frogge et al. |
| 2005/0176371 A1 | 8/2005 | Palin et al. |
| 2005/0220229 A1* | 10/2005 | Goto ............... H04L 7/042 375/343 |
| 2007/0014286 A1* | 1/2007 | Lai ............... H04L 27/2675 370/389 |
| 2007/0153761 A1 | 7/2007 | Fechtel |
| 2008/0130722 A1* | 6/2008 | Choi ............... H04L 27/2655 375/150 |
| 2009/0154529 A1* | 6/2009 | Cho ............... H04L 27/2662 375/137 |
| 2009/0175225 A1 | 7/2009 | Bi et al. |
| 2011/0050491 A1 | 3/2011 | Foerster et al. |
| 2014/0176341 A1 | 6/2014 | Bernhard et al. |
| 2016/0366649 A1* | 12/2016 | Bernhard ............... H04W 52/0277 |
| 2019/0288741 A1 | 9/2019 | Bernhard et al. |
| 2020/0036557 A1 | 1/2020 | Bernhard et al. |
| 2020/0336345 A1* | 10/2020 | Ito ............... H04L 27/0014 |
| 2021/0111939 A1* | 4/2021 | Ren ............... H04W 74/08 |

FOREIGN PATENT DOCUMENTS

| | | |
|---|---|---|
| CN | 101496335 A | 7/2009 |
| CN | 101919295 A | 12/2010 |
| DE | 102007028732 A1 | 12/2008 |
| DE | 102011082098 B4 | 4/2014 |
| DE | 102016220886 B3 | 3/2018 |
| DE | 102017206248 B3 | 7/2018 |
| WO | 2008155418 A1 | 12/2008 |
| WO | 2017/167366 A1 | 10/2017 |

OTHER PUBLICATIONS

Camran Syed, "Office Action for CA Application No. 3,097,635", dated Nov. 2, 2021, CIPO, Canada.

Young Hoe Koo, "Office Action for KR Application No. 10-2020-7033612", dated Dec. 9, 2021, KIPO, Republic of Korea.

* cited by examiner example 1: $N_P = 12, K = 3, L_K = 4, D_K = 4$
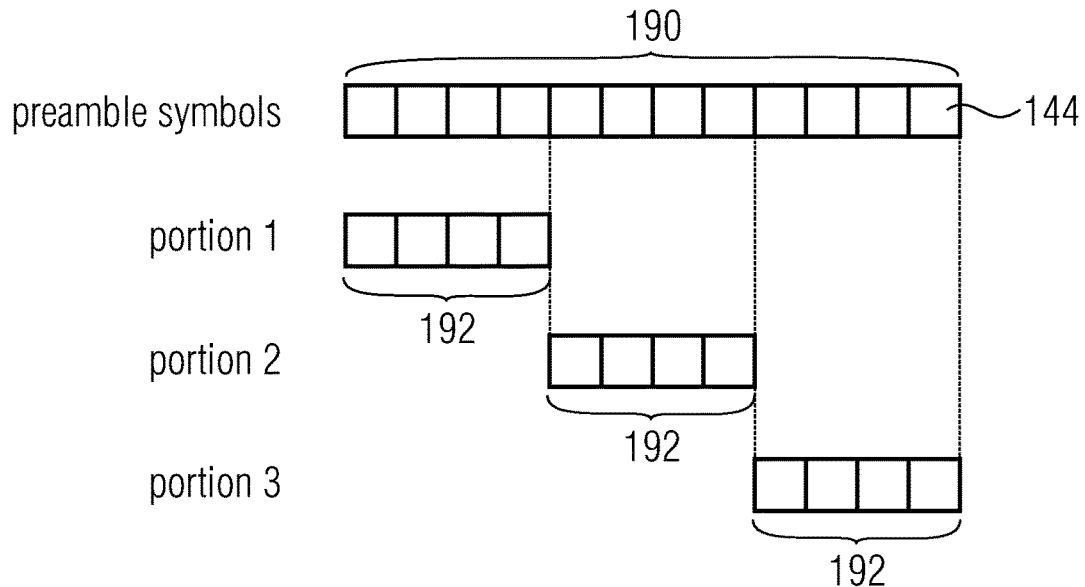
example 2: $N_P = 12, K = 5, L_K = 4, D_K = 2$
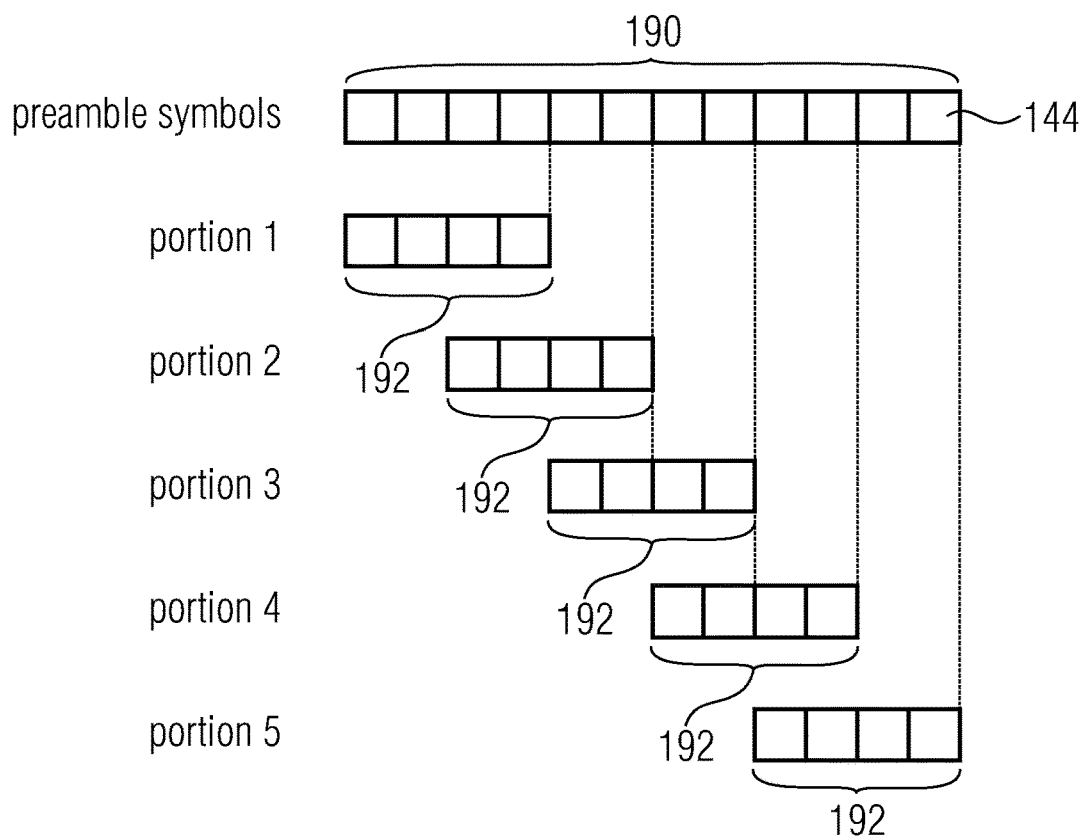
Fig. 13

PACKET CORRELATOR FOR A RADIO TRANSMISSION SYSTEM

CROSS-REFERENCE TO RELATED APPLICATIONS

This application is a continuation of copending International Application No. PCT/EP2019/059994, filed Apr. 17, 2019, which is incorporated herein by reference in its entirety, and additionally claims priority from German Application No. 102018206137.8, filed Apr. 20, 2018, which is also incorporated herein by reference in its entirety.

Embodiments relate to a data receiver and in particular to a data receiver for receiving a broadband signal comprising several partial data packets that are distributed in time and frequency according to a time frequency hopping pattern. Some embodiments relate to a packet correlator for a radio transmission system.

BACKGROUND OF THE INVENTION

From DE 10 2011 082 098 B4, a telegram splitting based radio transmission system is known, wherein a data packet (or telegram) to be transmitted is divided into a plurality of partial data packets, wherein the plurality of partial data packets are each shorter than the data packet and wherein the plurality of partial data packets are transmitted distributed in time and frequency according to a time frequency hopping pattern.

When emitting a plurality of data packets divided into partial data packets simultaneously or in a time-overlapping manner by a plurality of data transmitters, the computing power needed in the data receiver for detecting the partial data packets increases significantly.

SUMMARY

An embodiment may have a data receiver, wherein the data receiver is configured to receive a signal including a plurality of partial data packets, wherein the plurality of partial data packets each include part of a data packet, wherein the data receiver includes a multi-stage correlator configured to perform multi-stage correlation to detect the partial data packets in the received signal, wherein a second correlation stage of the multi-stage correlator operates based on correlation results of a first correlation stage of the multi-stage correlator, wherein the plurality of partial data packets are distributed in time and frequency according to a hopping pattern, wherein the multi-stage correlator is configured to detect the plurality of partial data packets in the received signal or a version derived therefrom.

According to another embodiment, a method for receiving a signal, wherein the signal includes a plurality of partial data packets, wherein the plurality of partial data packets each include part of a data packet, may have the steps of: performing multi-stage correlation to detect the plurality of partial data packets in the received signal, wherein a second correlation stage of the multi-stage correlation is performed based on correlation results of a first correlation stage of the multi-stage correlation, wherein the plurality of partial data packets are distributed in time and frequency according to a hopping pattern, wherein during multi-stage correlation, the plurality of partial data packets are detected in the received signal or a version derived therefrom.

Another embodiment may have a non-transitory digital storage medium having a computer program stored thereon to perform the inventive method for receiving a signal, when said computer program is run by a computer.

Embodiments provide a data receiver, wherein the data receiver is configured to receive a signal comprising a plurality of partial data packets [e.g. distributed in time and frequency according to a hopping pattern], wherein the plurality of partial data packets each comprise part of a data packet, wherein the data receiver comprises a multi-stage correlator configured to perform multi-stage correlation [e.g. of the received signal (e.g. in a first correlation stage) and a rendered (e.g. by the first correlation stage) version of the received signal (e.g. in a second correlation stage)] to detect the partial data packets [e.g. based on preambles of the same or by means of a blind estimation method] in the received signal, wherein a second correlation stage of the multi-stage correlator operates based on correlation results [e.g. based on the rendered version of the received signal] of a first correlation stage of the multi-stage correlator.

In embodiments, the multi-stage correlator can be configured to detect the plurality of partial data packets based on preambles of the same in the received signal.

In embodiments, the plurality of partial data packets can be distributed in time and frequency according to a hopping pattern, wherein the multi-stage correlator is configured to detect the plurality of partial data packets [e.g. based on preambles of the same] in the received signal or a version [e.g. a plurality of subband signals] derived therefrom.

In embodiments, the received signal can comprise a plurality of subband signals, wherein the plurality of subband signals comprise different [e.g. partly overlapping] subbands of the signal [e.g. broadband signal]. [For example, the data receiver can be configured to obtain a received signal comprising the plurality of subband signals based on the signal (e.g. broadband signals)].

In embodiments, the plurality of subband signals can be used directly for the correlation performed by the multi-stage correlator.

In embodiments, the multi-stage correlator can be configured to perform multi-stage correlation of at least one subset of the plurality of subband signals to detect the plurality of partial data packets in the subset of the plurality of subband signals. [For example, a number of provided subband signals and/or their sampling rate might not correspond to the respective values of the multi-stage correlator, such that the multi-stage correlator only processes part of the plurality of subband signals and/or only part of the samples].

In embodiments, the data receiver can be configured to multiply the plurality of subband signals with a complex exponential oscillation to increase the frequency resolution in the multi-stage correlator.

In embodiments, the multi-stage correlator can comprise a first correlation stage that can be configured to correlate the received signal or a version derived therefrom [e.g. a filtered and/or stored version of the signal to be received (e.g. a subband signal of the plurality of subband signals)] with a plurality of preamble portions corresponding [e.g. matching (e.g. in an undisturbed transmission channel)] to different [e.g. overlapping or adjacent] portions of the preambles of the plurality of partial data packets to obtain a plurality of portion correlation results [e.g. portion correlation amplitude; e.g. one portion correlation result (e.g. one correlation amplitude) per preamble portion per sample], wherein the first correlation stage is configured to combine [e.g. to add or incoherently add (e.g. by forming the absolute value)] the plurality of portion correlation results [e.g. per sample] to obtain a set of correlation results [e.g. (normalized) correlation amplitudes; e.g. for the signal to be received] or a subset of correlation results [e.g. (normalized) correlation amplitudes or a one-dimensional array of (normalized) correlation amplitudes; e.g. for the subband signal of the plurality of subband signals of the received signal] of the first correlation stage as correlation results of the first correlation stage.

In embodiments, the first correlation stage can be configured to normalize the plurality of portion correlation results [e.g. by forming squares of the absolute value].

In embodiments, the first correlation stage can be configured to normalize the plurality of portion correlation results in dependence on a determined [e.g. calculated] power (p[n]) of the received signal or the version derived therefrom [e.g. the filtered and/or stored version of the signal to be received (e.g. the subband signal of the plurality of subband signals)]. [For example, the first correlation stage can be configured to normalize the portion correlation results by forming squares of the absolute value, division by the determined power and calculating the roots of the quotients].

In embodiments, the power for normalizing can be determined across several subbands.

In embodiments, the power for normalizing can be determined based on synchronization symbols and at least one data symbol of the respective partial data packets.

In embodiments, the first correlation stage can be configured to normalize the plurality of portion correlation results separately, wherein the power is determined separately for each preamble portion or together for all preamble portions.

In embodiments, the first correlation stage can comprise a plurality of queue caches (e.g. ring buffers) that are configured to cache the respective portion correlation results, wherein the plurality of queue caches comprise different memory lengths, wherein the memory lengths of the plurality of queue caches depend on the respective preamble portions of the preambles of the plurality of partial data packets.

In embodiments, the first correlation stage can be configured to correlate at least two subband signals of the plurality of subband signals [e.g. several subband signals of the plurality of subband signals or all subband signals of the plurality of subband signals], each with the plurality of preamble portions, to obtain a subset of correlation results (e.g. normalized) correlation amplitudes or a one-dimensional array of (normalized) correlation amplitudes for each subband signal of the at least two subband signals], wherein the first correlation stage is configured to provide a set of correlation results comprising the subsets of correlation results as correlation results of the first correlation stage. [For example, the set of correlation results can comprise the one-dimensional subsets of correlation results].

In embodiments, the set of correlation results of the first correlation stage can be a two-dimensional array of correlation results, wherein a first dimension of the two-dimensional array of correlation results describes [e.g. a sequence of] sampling instants of the received signal [e.g. temporal direction], wherein a second dimension of the two-dimensional array of correlation results describes subbands of the received signal [e.g. frequency direction].

In embodiments, the first correlation stage can comprise an [e.g. multi-channel] output queue cache [e.g. ring buffer] that is configured to cache the set of correlation results of the first correlation stage.

In embodiments, the first correlation stage can be configured to calculate a maximum across correlation results of adjacent subband signals to discard the smaller values.

In embodiments, the plurality of partial data packets can comprise at least two different preambles, wherein the first correlation stage is configured to correlate the received signal with a second plurality of preamble portions corresponding [e.g. matching (e.g. in an undisturbed transmission channel)] to different [e.g. overlapping or adjacent] portions of a second preamble of the plurality of partial data packets to obtain at least a second plurality of portion correlation results [e.g. portion correlation amplitudes; e.g. one portion correlation result (e.g. one correlation amplitude) per preamble portion per sample], wherein the first correlation stage is configured to combine [e.g. to add or incoherently add (e.g. by forming the absolute value)] the second plurality of portion correlation results [e.g. per sample] to obtain a second set of correlation results [e.g. (normalized) correlation amplitudes; e.g. for the signal to be received] or a second subset of correlation results [e.g. (normalized) correlation amplitudes or a one-dimensional array of (normalized) correlation amplitudes; e.g. for the subband signal of the plurality of subband signals of the received signal to be processed].

In embodiments, the at least two preambles can have different lengths.

In embodiments, the plurality of partial data packets can comprise the same preamble.

In embodiments, the at least two partial data packets can be a plurality of partial data packets, wherein at least two groups of partial data packets of the plurality of partial data packets [e.g. the at least two groups of partial data packets are real [e.g. disjoint] subsets of the plurality of partial data packets] have the same relative group hopping pattern in groups [e.g. such that partial data packets of the at least two groups of partial data packets have the same relative time interval and frequency spacing to one another, or in other words, such that partial data packets of a first group of partial data packets comprise the same relative hopping pattern (=group hopping pattern) as partial data packets of a second group of partial data packets], wherein the second correlation stage is configured to select and to combine in groups [e.g. to add], from the set of correlation results [e.g. a two-dimensional array of correlation results] of the first correlation stage, groups of correlation results based on a group correlation pattern [e.g. indicating time intervals and frequency spacings of the correlation results of the two-dimensional array of correlation results] derived from the group hopping pattern [e.g. indicating relative time intervals and frequency spacings of the group of partial data packets] to obtain a set of correlation results of the second correlation stage. For example, a second data packet of the first group of data packets can have the same time intervals and frequency spacings to a first data packet of the first group of data packets as a fourth data packet of the second group of data packets to a third data packet of the second group of data packets.

In embodiments, the second correlation stage can be configured to select the groups of correlation results from the set of correlation results of the first correlation stage in temporal and/or frequency direction based on the group correlation pattern.

In embodiments, the set of correlation results of the first correlation stage can be a two-dimensional array of correlation results, wherein the group correlation pattern indicates time intervals and frequency spacings of the correlation results of the two-dimensional array of correlation results of the first correlation stage that correspond to the relative time intervals and frequency spacings of the group hopping pattern of the groups of partial data packets.

In embodiments, the set of correlation results of the second correlation stage can be a two-dimensional array of correlation results, wherein a first dimension of the two-dimensional array of correlation results describes a [e.g. relative] temporal position of the group of partial data packets [temporal direction], wherein a second dimension of the two-dimensional array of correlation results describes a [e.g. relative] frequency position of the group of partial data packets [frequency direction].

In embodiments, at least one dimension [e.g. frequency direction] of the two-dimensional array of correlation results of the second correlation stage can be smaller than the respective at least one dimension of the two-dimensional array of correlation results of the first correlation stage.

In embodiments, the second correlation stage can comprise an [e.g. two-dimensional] output queue cache [e.g. ring buffer] that is configured to cache the set of correlation results of the second correlation stage.

In embodiments, at least two further groups of partial data packets of the plurality of partial data packets can comprise the same relative further group hopping pattern in groups [e.g. such that partial data packets of the at least two further groups of partial data packets have the same relative time interval and frequency spacing to one another, or in other words, such that partial data packets of a third group of partial data packets comprise the same relative further hopping pattern (=further group hopping pattern) as partial data packets of a fourth group of partial data packets], wherein the second correlation stage is configured to select and to combine in groups [e.g. to add], from the set of correlation results [e.g. a two-dimensional array of correlation results] of the first correlation stage, further groups of correlation results based on a further group correlation pattern [e.g. indicating time intervals and frequency spacings of the correlation results of the two-dimensional array of correlation results] derived from the further group hopping pattern [e.g. indicating relative time intervals and frequency spacings of the second group of partial data packets] to obtain a set of further correlation results of the second correlation stage, wherein the group hopping pattern and the further group hopping pattern are different.

In embodiments, the at least two groups of partial data packets can form a sequence, wherein the at least two groups of partial data packets comprise a relative group sequence hopping pattern [e.g. relative time intervals and frequency spacings between the groups] to one another, wherein the data receiver comprises a third correlation stage that is configured to select and to combine in groups [e.g. to add], from the set of correlation results [e.g. a two-dimensional array of correlation results] of the second correlation stage, groups of correlation results based on a group sequence correlation pattern [e.g. indicating time intervals and frequency spacings of the correlation results of the two-dimensional array of correlation results] derived from the group sequence hopping pattern to obtain a set of correlation results of the third correlation stage.

In embodiments, the third correlation stage can be configured to select the groups of correlation results from the set of correlation results of the second correlation stage in temporal and/or frequency direction based on the group sequence correlation pattern.

In embodiments, the set of correlation results of the second correlation stage can be a two-dimensional array of correlation results, wherein the group sequence correlation pattern indicates time intervals and frequency spacings of the correlation results of the two-dimensional array of correlation results of the second correlation stage that correspond to the relative time intervals and frequency spacings of the group sequence hopping pattern.

In embodiments, the set of correlation results of the third correlation stage can be a two-dimensional array of correlation results, wherein a first dimension of the two-dimensional array of correlation results describes a [e.g. relative] temporal position of the groups of partial data packets [temporal direction], wherein a second dimension of the two-dimensional array of correlation results describes a relative frequency position of the group of partial data packets [frequency direction].

In embodiments, at least one dimension [e.g. frequency direction] of the two-dimensional array of correlation results of the third correlation stage can be smaller than the respective at least one dimension of the two-dimensional array of correlation results of the second correlation stage.

In embodiments, the third correlation stage can comprise an [e.g. multi-channel] output queue cache [e.g. ring buffer] that is configured to cache the set of correlation results of the third correlation stage.

In embodiments, the data receiver can be configured to transmit the set of correlation results in a suitable form to a subsequent packet detection.

In embodiments, the at least two groups of partial data packets can form a further sequence [e.g. a first group and a second group of partial data packets form a first sequence, wherein a third group and a fourth group of partial data packets form a second sequence], wherein the at least two groups of partial data packets have a relative further group sequence hopping pattern [e.g. relative time intervals and frequency spacings between the groups] to one another, wherein the data receiver comprises a third correlation stage that is configured to select and to combine in groups [e.g. to add], from the set of correlation results [e.g. a two-dimensional array of correlation results] of the second correlation stage group of correlation results based on a further group sequence correlation pattern [e.g. indicating time intervals and frequency spacings of the correlation results of the two-dimensional array of correlation results] derived from the further group sequence hopping pattern to obtain a further set of correlation results of the third correlation stage, wherein the group sequence hopping pattern and the further group sequence hopping pattern are different.

In embodiments, the data packets can be distributed in time and frequency according to a hopping pattern, wherein the second correlation stage can be configured to select and to combine in groups [e.g. to add or coherently add], from the set of correlation results [e.g. a two-dimensional array of correlation results] of the first correlation stage, groups of correlation results based on a correlation pattern [e.g. indicating time intervals and frequency spacings of the correlation results of the two-dimensional array of correlation results] derived from the hopping pattern of the partial data packets to obtain a set of correlation results of the second correlation stage.

In embodiments, the second correlation stage can be configured to select the groups of correlation results from the set of correlation results of the first correlation stage in temporal and/or frequency direction based on the correlation pattern.

In embodiments, the set of correlation results of the first correlation stage can be a two-dimensional array of correlation results, wherein the correlation pattern indicates time intervals and frequency spacings of the correlation results of the two-dimensional array of correlation results of the first correlation stage that correspond to the relative time intervals and frequency spacings of the hopping pattern of the partial data packets.

In embodiments, the set of correlation results of the second correlation stage can be a two-dimensional array of correlation results, wherein a first dimension of the two-dimensional array of correlation results describes a [e.g. relative] temporal position of the partial data packets (temporal direction), wherein a second dimension of the two-dimensional array of correlation results describes a [e.g. relative] frequency position of the partial data packets [frequency direction].

In embodiments, the first dimension and/or the second dimension of the two-dimensional array of correlation results of the second correlation stage can be smaller than the respective dimension of the two-dimensional array of correlation results of the first correlation stage.

In embodiments, the second correlation stage can comprise an [e.g. multi-channel] output queue cache [e.g. ring buffer] that is configured to cache the set of correlation results of the second correlation stage.

In embodiments, the data receiver can be configured to transmit the set of correlation results in a suitable form to a subsequent packet detection.

In embodiments, at least two further groups of partial data packets of the plurality of partial data packets can comprise the same relative further group hopping pattern in groups [e.g. such that partial data packets of the at least two further groups of partial data packets have the same relative time interval and frequency spacing to one another, or in other words, such that partial data packets of a third group of partial data packets have the same relative further hopping pattern (=further group hopping pattern) as partial data packets of a fourth group of partial data packets], wherein the second correlation stage is configured to select and to combine in groups [e.g. to add], from the set of correlation results [e.g. a two-dimensional array of correlation results] of the first correlation stage, further groups of correlation results based on a further group correlation pattern [e.g. indicating time intervals and frequency spacings of the correlation results of the two-dimensional array of correlation results] derived from the further group hopping pattern [e.g. indicating relative time intervals and frequency spacings of the second group of partial data packets] to obtain a set of further correlation results of the second correlation stage, wherein the group hopping pattern and the further group hopping pattern are different.

Further embodiments provide a method for receiving a signal, wherein the signal comprises a plurality of partial data packets [e.g., distributed in time and frequency according to a hopping pattern], wherein the plurality of partial data packets each comprise part of a data packet. The method includes a step of performing multi-stage correlation [e.g. of the received signal) (e.g. in a first correlation stage) and a rendered (e.g. by the first correlation stage) version of the signal to be processed (e.g. in a second correlation stage)] to detect the plurality of partial data packets [e.g. based on preambles of the same] in the received signal, wherein a second correlation stage of the multi-stage correlation is performed based on correlation results [e.g. based on the rendered version of the received signal] of a first correlation stage of the multi-stage correlation.

Further embodiments provide a data receiver that is configured to receive a signal comprising at least one data packet, wherein the data packet comprises a preamble, wherein the data receiver comprises a correlation stage that is configured to correlate the received signal or a version derived therefrom [e.g. a filtered and/or stored version of the received signal] with a plurality of preamble portions corresponding [e.g. matching (e.g. in an undisturbed transmission channel)] to different (e.g. overlapping or adjacent) portions of the preamble of the data packet) to obtain a plurality of portion correlation results [e.g. portion correlation amplitudes; e.g. one portion correlation result (e.g. one correlation amplitude) per preamble portion per sample], wherein the first correlation stage is configured to combine [e.g. to add or incoherently add (e.g. by forming the absolute value)] the plurality of portion correlation results [e.g. per sample] to obtain a set of correlation results [e.g. (normalized) correlation amplitudes; e.g. for the signal to be received], wherein the first correlation stage is configured to normalize the plurality of portion correlation results [e.g. by forming squares of the absolute value], wherein the first correlation stage is configured to normalize the plurality of portion correlation results in dependence on a determined (e.g. calculated) power or interference power (p[n]) of the signal to be received or the version derived therefrom [e.g. the filtered and/or stored version of the signal to be received].

In embodiments, the correlation stage can be configured to correlate the signal to be processed or a version derived therefrom with a plurality of preamble portions corresponding [e.g. matching (e.g. in an undisturbed transmission channel)] to different [e.g. overlapping or adjacent] portions of the preamble of the data packet to obtain the plurality of portion correlation results [e.g. portion correlation amplitudes; e.g. one portion correlation result (e.g. a correlation amplitude) per preamble portion per sample].

In embodiments, the first correlation stage can be configured to normalize the portion correlation results by forming squares of the absolute value, division by the determined power and calculating the roots of the quotients.

Further embodiments provide a method for receiving a signal, wherein the signal comprises at least one data packet, wherein the data packet comprises a preamble. The method includes a step of correlating the received signal or a version derived therefrom [e.g. a filtered and/or stored version of the received signal] with a plurality of preamble portions corresponding [e.g. matching (e.g. in an undisturbed transmission channel)] to different [e.g. overlapping or adjacent] portions of the preamble of the data packet to obtain a plurality of portion correlation results [e.g. portion correlation amplitudes; e.g. one portion correlation result (e.g. one correlation amplitude) per preamble portion per sample]. Further, the method includes a step of normalizing the plurality of portion correlation results, wherein the plurality of portion correlation results is normalized in dependence on a determined (e.g. calculated) power or interference power (p[n]) of the received signal or the version derived therefrom [e.g. the filtered and/or stored version of the received signal]. Further, the method comprises a step of combining [e.g. adding or incoherently adding] the plurality of normalized portion correlation results [e.g. per sample] to obtain a set of correlation results [e.g. (normalized) correlation amplitudes; e.g. for the received signal].

BRIEF DESCRIPTION OF THE DRAWINGS

Embodiments of the present invention will be detailed subsequently referring to the appended drawings, in which:

FIG. 13 is a schematic view of an exemplary division of a preamble according to an embodiment;

DETAILED DESCRIPTION OF THE INVENTION

In the subsequent description of the embodiments of the present invention, equal or functionally equal elements are provided with the same reference numbers in the figures such that their description is inter-exchangeable.

1. Telegram-Splitting Based Radio Transmission System 1.1 Overview

Figure 1:
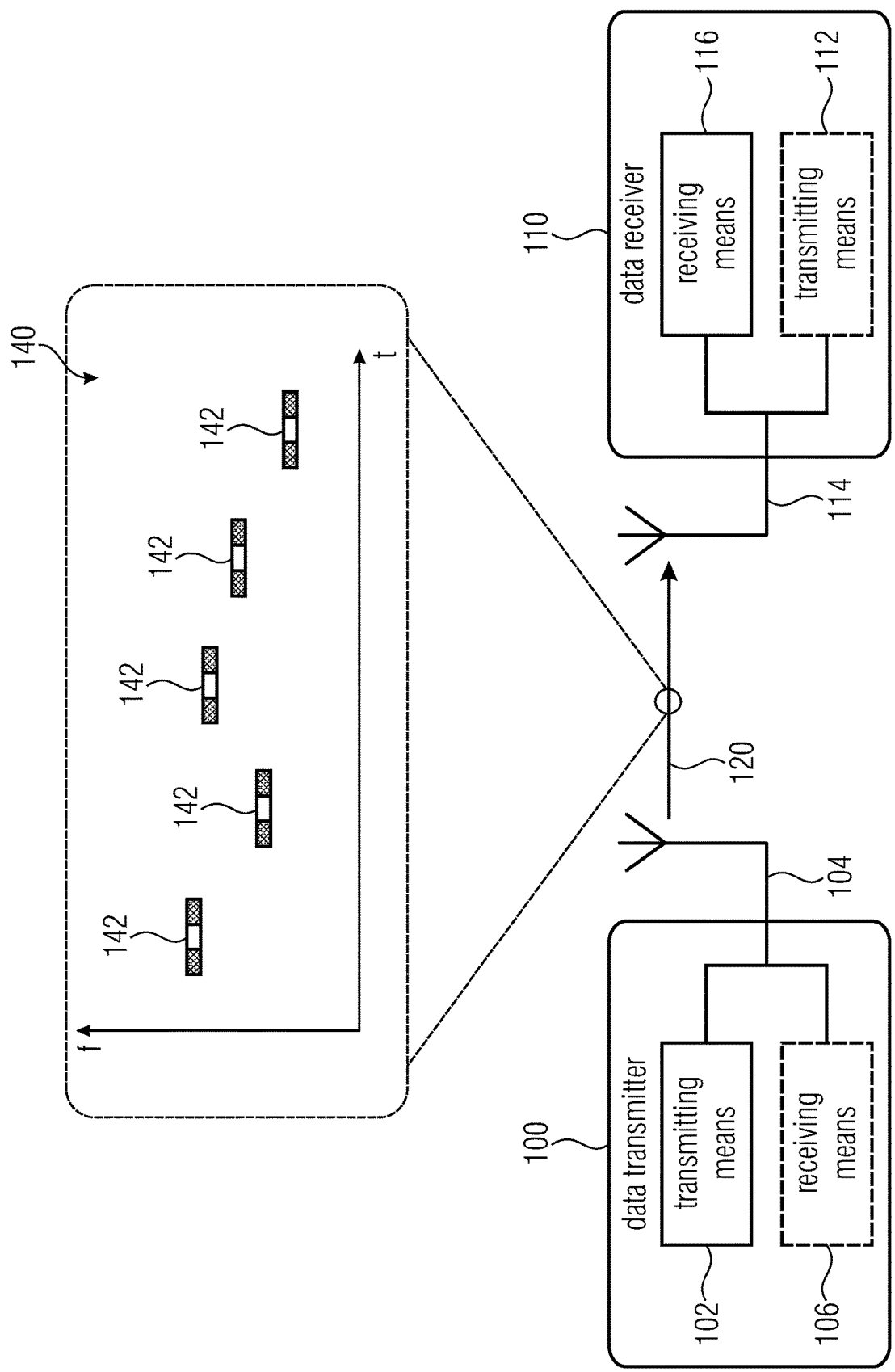
FIG. 1 is a schematic block diagram of a system with a data transmitter and a data receiver.

FIG. 1 shows a schematic block diagram of a system with a data transmitter 100 and a data receiver 110. The data transmitter 100 can be configured to transmit a signal 120, wherein the signal 120 comprises at least two separate partial data packets 142. The data receiver 110 can be configured to receive the signal 120 (or a version of the signal 120 modified by the transmission channel) that comprises the at least two separate partial data packets 142.

As can be seen in FIG. 1, the at least two separate partial data packets 142 are separated or spaced apart from another in time and/or in frequency. The distribution of the at least two separate partial data packets 142 in time and/or frequency can take place according to a hopping pattern 140.

In embodiments, the data transmitter 100 can comprise transmitting means (or a transmitting module or transmitter) 102 that is configured to transmit the signal 120. The transmitting means 102 can be connected to an antenna 104 of the data transmitter 100. Further, the data transmitter 100 can comprise receiving means (or a receiving module or receiver) 106 that is configured to receive a signal. The receiving means 106 can be connected to the antenna 104 or a further (separate) antenna of the data transmitter 100. The data transmitter 100 can also comprise a transceiver.

In embodiments, the data receiver 110 can comprise receiving means (or a receiving module or receiver) 116 that is configured to receive the signal 120. The receiving means 116 can be connected to an antenna 114 of the data receiver 110. Further, the data receiver 110 can comprise transmitting means (or a transmitting module or transmitter) 112 that is configured to transmit a signal. The transmitting means 112 can be connected to the antenna 114 or a further (separate) antenna of the data receiver 110. The data receiver 110 can also comprise a transceiver.

In embodiments, the data transmitter 100 can be a sensor node, while the data receiver 110 can be a base station. Typically, a communication system includes at least one data receiver 110 (base station) and a plurality of data transmitters (sensor nodes, such as heating meters). Obviously, it is also possible that the data transmitter 100 is a base station while the data receiver 110 is a sensor node. Further, it is possible that both the data transmitter 100 as well as the data receiver 110 are sensor nodes. Further, it is possible that both the data transmitter 100 and the data receiver 110 are base stations.

The data transmitter 100 and the data receiver 110 can be configured to transmit or receive data by using a telegram splitting method. Here, a data packet (or telegram) comprising the data is divided into a plurality of partial data packets (or subdata packets) 142 and the partial data 142 are transmitted from the data transmitter 100 to the data receiver 110, distributed in time and/or distributed in frequency according to a hopping pattern 140, wherein the data receiver 110 joins (or combines) the partial data packets 142 again to obtain the actual data packet. Each of the partial data packets 142 includes only part of the data packet 120. Further, the data packet can be channel-coded such that not all partial data packets 142, but only part of the partial data packets 142 are needed for error-free decoding of the data packet.

As already mentioned, the temporal distribution of the plurality of partial data packets 142, can take place according to a time and/or frequency pattern 140.

A time hopping pattern can indicate a sequence of transmitting instants or transmitting intervals at which the partial data packets are transmitted. For example, a first partial data packet can be transmitted at a first transmitting instant (or in a first transmitting time slot) and a second partial data packet at a second transmitting instant (or in a second transmitting time slot), wherein the first transmitting instant and the second transmitting instant are different. Here, the time hopping pattern can define (or determine or indicate) the first transmitting instant and the second transmitting instant. Alternatively, the time hopping pattern can indicate the first transmitting instant and a time interval between the first transmitting instant and the second transmitting instant. Obviously, the time hopping pattern can also indicate only the time interval between the first instant and the second transmitting instant. Between the partial data packets, transmission pauses can exist where no transmission takes place. The partial data packets can also overlap in time (intersect each other).

The frequency hopping pattern can indicate a sequence of transmitting frequencies or transmitting frequency hops by which the partial data packets are transmitted. For example, a first partial data packet can be transmitted with a first transmitting frequency (or in a first frequency channel) and a second partial data packet with a second transmitting frequency (or in the second frequency channel), wherein the first transmitting frequency and the second transmitting frequency are different. Here, the frequency hopping pattern can define (or determine or indicate) the first transmitting frequency and the second transmitting frequency. Alternatively, the frequency hopping pattern can indicate the first transmitting frequency and a frequency spacing (transmitting frequency hop) between the first transmitting frequency and the second transmitting frequency. Obviously, the frequency hopping pattern can also indicate only the frequency spacing (transmitting frequency hop) between the first transmitting frequency and the second transmitting frequency.

Obviously, the plurality of partial data packets 142 can be transmitted both distributed in time and in frequency from the data transmitter 100 to the data receiver 110. The distribution of the plurality of partial data packets in time and frequency can take place according to a time frequency hopping pattern. A time frequency hopping pattern can be the combination of a time hopping pattern and a frequency hopping pattern, i.e. a sequence of transmitting instants or transmitting time intervals by which the partial data packets 142 are transmitted, wherein transmitting frequencies (or transmitting frequency hops) are allocated to the transmitting instants (or transmitting time intervals).

Figure 2:
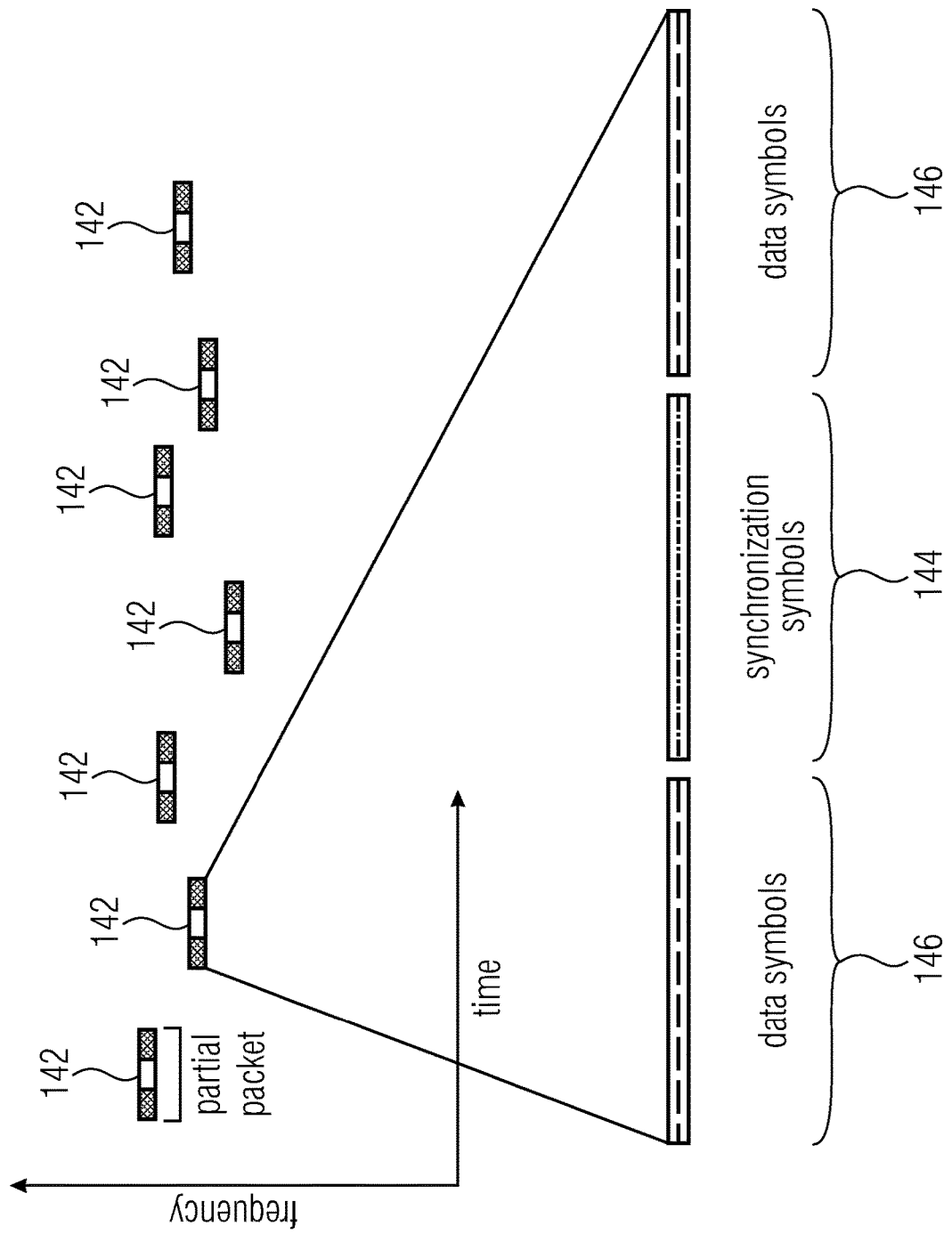
FIG. 2 shows, in a diagram, an occupancy of the transmission channel during transmission of a plurality of partial data packets according to a time frequency hopping pattern and an exemplary structure of a partial packet consisting of data and synchronization symbols.

FIG. 2 shows in a diagram an occupancy of the transmission channel during transmission of a plurality of partial data packets 142 according to a time frequency hopping pattern. Here, the ordinate describes the frequency and the abscissa the time.

As can be seen in FIG. 2, the data packet 120 can exemplarily be divided into n=7 partial data packets 142 and can be transmitted from the data transmitter 100 to the data receiver 110 distributed in time and frequency according to a time frequency hopping pattern.

As can further be seen in FIG. 2, apart from data (data symbols 146 in FIG. 2), the plurality of partial data packets 142 can also include pilot sequences (pilot symbols) (or synchronization symbols 144 in FIG. 2), based on which the data receiver 110 detects the partial data packets 142 in a receiving signal 120 or receiving data stream.

During simultaneous or time overlapping emission of a plurality of data packets divided into partial data packets by a plurality of data transmitters, the computing power needed in the data receiver for detection and decoding of the partial data packets increases significantly.

For reducing the computing power needed for detection and decoding, in embodiments, detection and decoding of the partial data packets takes place separately, as will be discussed below.

1.2 Group Formation

Figure 3:
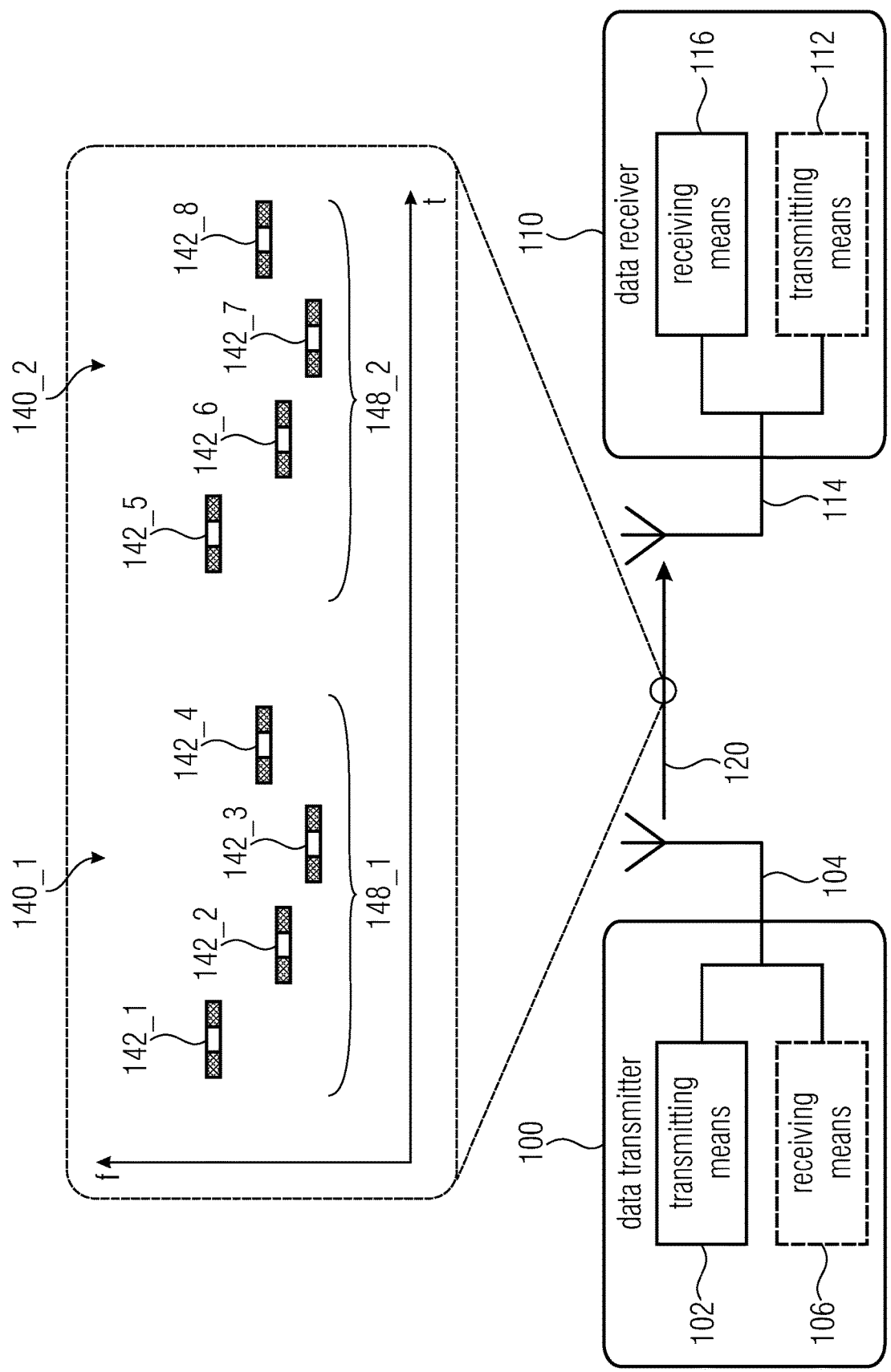
FIG. 3 is a schematic block diagram of a system with a data transmitter and a data receiver.

FIG. 3 shows a schematic block diagram of a system with a data transmitter 100 and a data receiver 110. The data transmitter 100 is configured to transmit a signal 120, which comprising a plurality of partial data packets 142_1 to 142_8, wherein at least two groups 148_1 and 148_2 of partial data packets 142_1 to 142_8 comprise the same relative group hopping pattern 140_1 and 140_2 in groups.

For example, as shown in FIG. 3, a first group 148_1 of partial data packets (e.g. the partial data packets 142_1 to 142_4) and a second group 148_2 of partial data packets (e.g. the partial data packets 142_5 to 124_8) can comprise the same relative group hopping pattern 140_1 and 140_2. In other words, the second group hopping pattern 140_2 can be a version of the first group hopping pattern 140_1 shifted in time and/or in frequency.

The receiver 110 can be configured to receive the signal 120 (or a version of the signal 120 modified by a transmission channel between data transmitter 100 and data receiver 110), wherein the signal 120 comprises a plurality of partial data packets 142_1 to 142_8, wherein at least two groups 148_1 to 148_2 have the same relative group hopping pattern 140_1 and 140_2 in groups.

In FIG. 3, it is exemplarily assumed that the partial data packets 142_1 to 142_8 are transmitted by using at least two frequency and time hopping patterns (i.e. combined frequency hopping patterns and time hopping patterns) 140_1 and 140_2. Obviously, the partial data packets 142_1 to 142_8 can also be transmitted by using only pure frequency hopping patterns or time hopping patterns.

As can be seen in FIG. 3, the second group hopping pattern 140_2 can be a version of the first group hopping pattern 140_1 shifted in time. Alternatively, the second group hopping pattern 140_2 can also be a version of the first group hopping pattern 140_1 shifted in frequency. Obviously, the second group hopping pattern 140_2 can also be a version of the first group hopping pattern 140_1 shifted in time and frequency.

In FIG. 3, the signal 120 includes exemplarily n=8 partial data packets 142_1 to 142_n that are transmitted by using m=2 time hopping patterns and/or frequency hopping patterns 140_1 to 140_m. In embodiments, a number n of the partial data packets can be an integer plurality of a number m of time hopping patterns and/or frequency hopping patterns, such that the partial data packets can be divided equally to the number m of time hopping patterns and/or frequency hopping patterns, wherein the number n of partial data packets 142_1 to 142_n is at least twice as high as the number m of time hopping patterns and/or frequency hopping patterns 140_1 to 140_m, such that at least two partial data packets are transmitted in each time hopping pattern and/or frequency hopping pattern 140_1 to 140_m.

Here, the data can be transmitted such that transmission pauses (intermissions where the data transmitter does not transmit) exist between the partial data packets 142_1 to 142_n.

The data can be a telegram that is divided in the plurality of partial data packets 142_1 to 142_m, wherein each of the plurality of partial data packets 142_1 to 142_m is shorter than the telegram.

Figure 4:
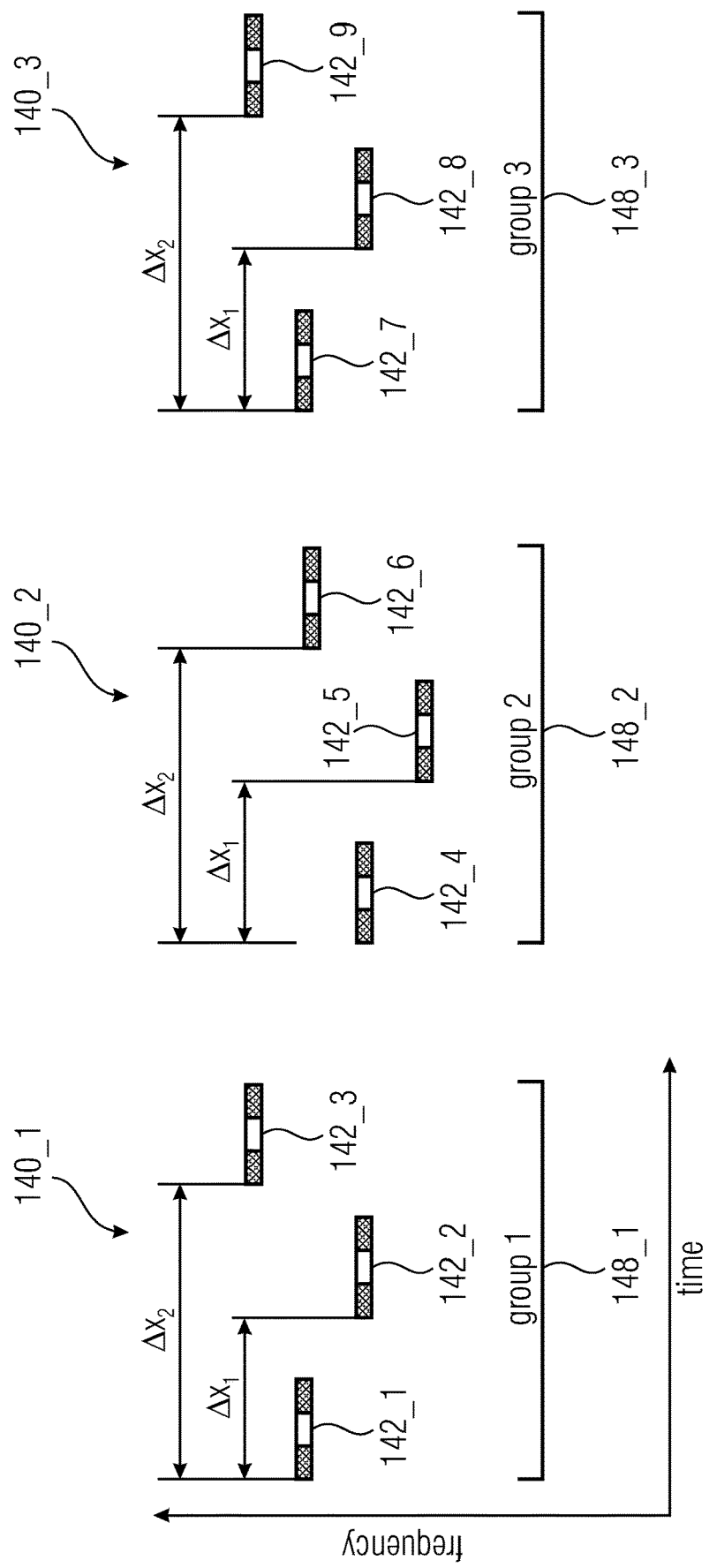
FIG. 4 shows, in a diagram, an occupancy of a transmission channel during transmission of a plurality of partial data packets, wherein three groups of partial data packets of the plurality of partial data packets comprise the same relative group hopping pattern in groups.

FIG. 4 shows in a diagram an occupancy of a transmission channel during transmission of a plurality of partial data packets 142_1 to 142_n, wherein three groups of partial data packets of the plurality of partial data packets comprise the same relative group hopping pattern 140_1, 140_2 and 140_3 in groups.

As can be seen exemplarily in FIG. 4, nine partial data packets 142_1 to 142_9 can be divided into three groups 148_1 to 148_3, such that each of the three groups 148_1 to 148_3 includes three of the partial data packets 142_1 to 142_9. Here, the second group hopping pattern 140_2 can be a version of the first group hopping pattern 140_1 shifted in time and frequency, wherein the third group hopping pattern 140_3 can be a version of the first group hopping pattern 140_1 shifted in time and frequency. The time intervals Δx1 and Δx2 and the frequency spacings between the partial data packets are the same in the three group hopping patterns 140_1 to 140_3. The partial data packets 142_1 to 142_9 or at least part of the partial data packets can be provided with synchronization sequences or partial synchronization sequences (divided synchronization sequence) for synchronization and/or detection at the data receiver.

In other words, FIG. 4 shows a division of partial data packets 142_1 to 142_n in groups 148_1 to 148_m. FIG. 4 shows this method exemplarily for nine partial data packets 142_1 to 142_9 combined to three groups 148_1 to 148_3 of the size of three partial data packets. Within these groups 148_1 to 148_3, the group hopping pattern for time and/or frequency is the same. The intermissions and frequencies can differ between the groups 148_1 to 148_3.

However, during the simultaneous or time-overlapping emission of a plurality of data packets divided into partial data packets by a plurality of data transmitters, the computing power needed in the data receiver for detecting partial data packets increases significantly.

For reducing the computing power needed for detection and decoding, in embodiments, multi-stage correlation for detecting the partial data packets 142 takes place, as will be discussed below.

2. Embodiments of the Data Receiver (System Description)

Figure 5A:
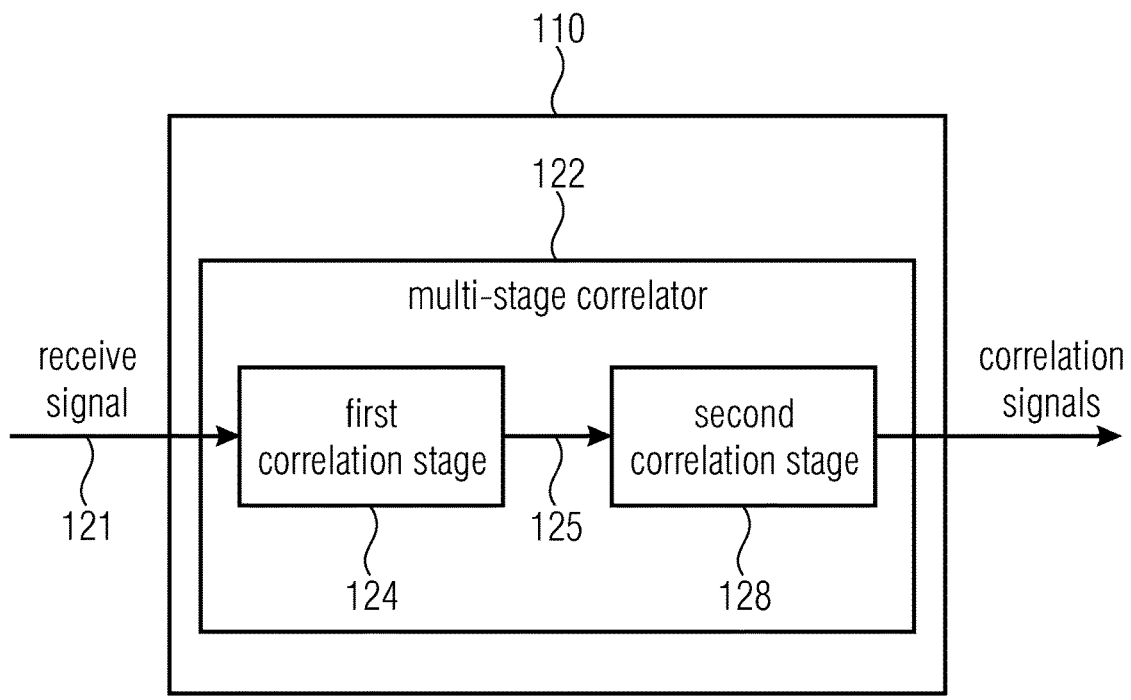
FIG. 5a is a schematic block diagram of a data receiver with a multi-stage correlator according to an embodiment.

FIG. 5a shows a schematic block diagram of a data receiver 110 according to an embodiment. The data receiver 110 can be configured to receive a signal 120 comprising a plurality of partial data packets 142 distributed in time and frequency, e.g. according to a hopping pattern, wherein the plurality of partial data packets 142 each comprise part of a data packet.

As can be seen in FIG. 5a, the data receiver 110 (or a packet detector of the data receiver 110) can comprise a multi-stage correlator 122 that can be configured to perform multi-stage correlation to detect the partial data packets 142 in the received signal 121, wherein a second correlation stage 128 of the multi-stage correlator 122 operates based on correlation results 125 of a first correlation stage 124 of the multi-stage correlator 122.

In embodiments, the multi-stage correlator 122 can be configured to perform a multi-stage correlation, in detail a first correlation of the received signal 121 in the first correlation stage 124 and a second correlation of a rendered version of the received signal 125 (=correlation results of the first correlation stage) in the second correlation stage 128.

In embodiments, the multi-stage correlator 122 can be configured to detect the partial data packets 142 based on preambles of the same in the received signal 121. Alternatively, the multi-stage correlator 122 can be configured to detect the partial data packets 142 by means of a blind estimation method.

Figure 5B:
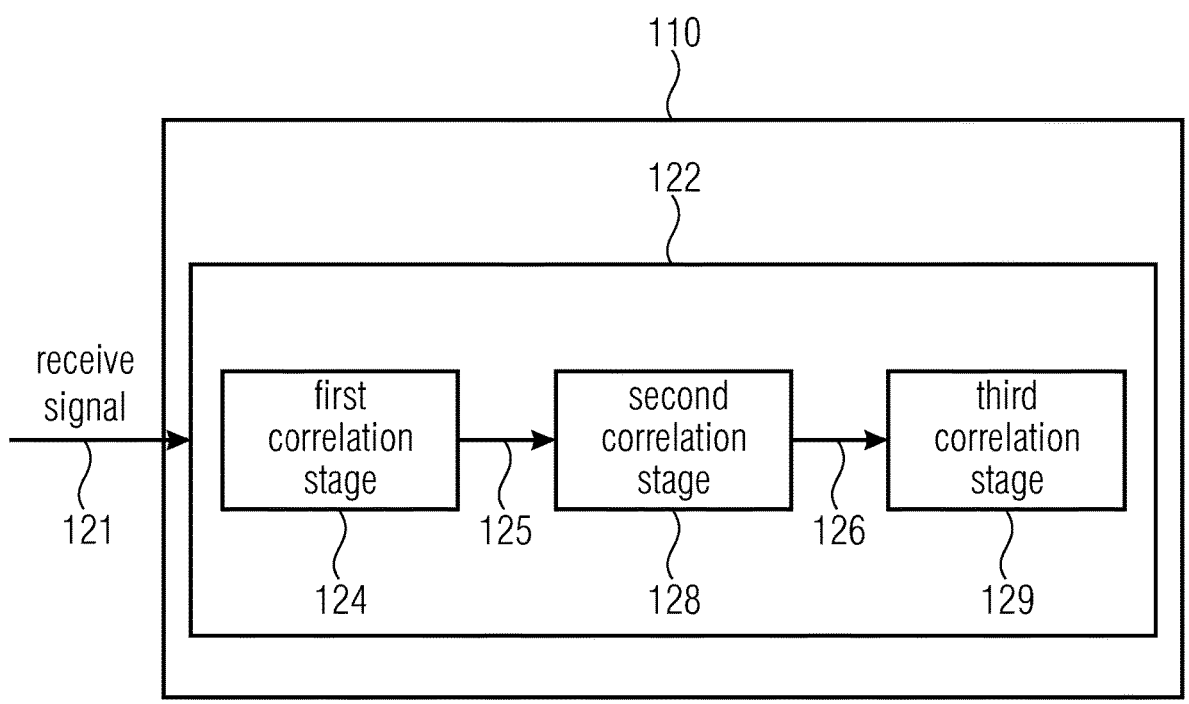
FIG. 5b is a schematic block diagram of a data receiver with a multi-stage correlator according to a further embodiment.

FIG. 5b shows a schematic block diagram of a data receiver 110 according to a further embodiment of the present invention. The data receiver 110 can be configured to receive a signal 120 comprising a plurality of partial data packets 142 that are distributed in time and frequency, e.g. according to a hopping pattern, wherein the plurality of partial data packets 142 each comprise part of a data packet.

As can be seen in FIG. 5b, the data receiver 110 (or a packet detector of the data receiver 110) can comprise a multi-stage correlator 122 that can be configured to perform multi-stage correlation to detect the partial data packets 142 in the received signal 121. The multi-stage correlator 122 can comprise a first correlation stage 124, a second correlation stage 128 and a third correlation stage 129, wherein the second correlation stage 128 operates based on correlation results 125 of the first correlation stage 124, wherein the third correlation stage 129 operates based on correlation results 126 of the second correlation stage 128.

Embodiments relate to preamble correlation and the detection of data packets in the receiver 110 of a radio transmission system. The term "preamble" for the symbols used for correlation is here used independently of the arrangement of the preamble within the data packets and therefore includes the cases referred to as preamble, midamble and postamble. In the following, the method will be discussed with the example of a preamble arranged exactly in the center, but applies accordingly to other arrangements.

Figure 6:
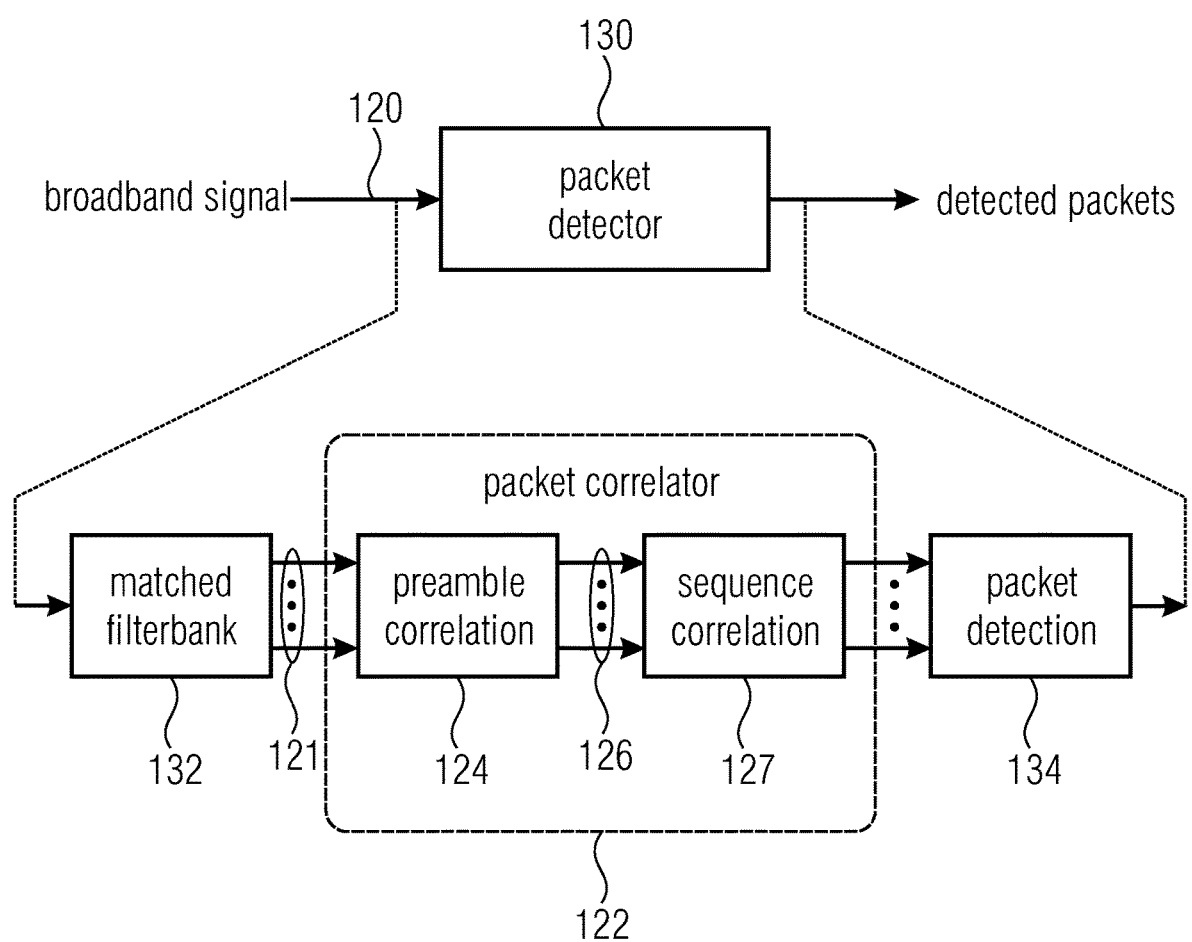
FIG. 6 is a schematic block diagram of a packet detector (multi-stage correlator) of a data receiver according to an embodiment.

FIG. 6 shows a schematic block diagram of a packet detector 130 of a data receiver 110 according to an embodiment. The packet detector 130 can comprise an (optional) filterbank (e.g. a matched filterbank) 132, the multi-stage correlator 122 with the first correlation stage (e.g. preamble correlation) 124 and further correlation stages (e.g. sequence correlation) 127 as well as packet detection 134. The further correlation stages 124 consist either of a second correlation stage 128 according to FIG. 5a or of a second 128 and a third 129 correlation stage according to FIG. 5b.

In other words, as can be seen in FIG. 6, the packet correlator (multi-stage correlator) 122 is part of a packet detector 130. Exemplarily, the packet detector 130 can comprise the following components:
 an (optional) matched filterbank 132 for dividing a broadband signal 120 in channels to be processed in parallel;
 a preamble correlation 124 for channel-by-channel correlation with the known symbols of the preamble;
 a sequence correlation 127 for combining the results for packets consisting of several partial packets, each having its own preamble;
 a packet detection 134 for detecting the packets.

The preamble correlation 124 and the sequence correlation 127 form the packet correlator 122.

As can be seen in FIG. 6, the received signal 121 can comprise a plurality of channels.

In embodiments, the data receiver 110 can comprise, for example, the filterbank 132 to obtain, based on the signal 120 (e.g. a broadband signal in FIG. 6) a received signal 121 (e.g. a signal to be processed) having a plurality of channels. Instead of the filterbank 132, the data receiver 110 can also comprise a group of narrowband receivers to obtain a received signal 121 having a plurality of channels based on the signal 120. For example, the receiving frequencies of the plurality of narrowband receivers can be adjusted such that the same signals result as at the output of the filterbank 132 shown in FIG. 6.

In the subsequent description, the plurality of channels of the received signal 121 (e.g. signal to be processed) are referred to as subband signals. Here, the subband signals can have different bands of the signal 120, how the same are obtained is insignificant.

Figure 7:
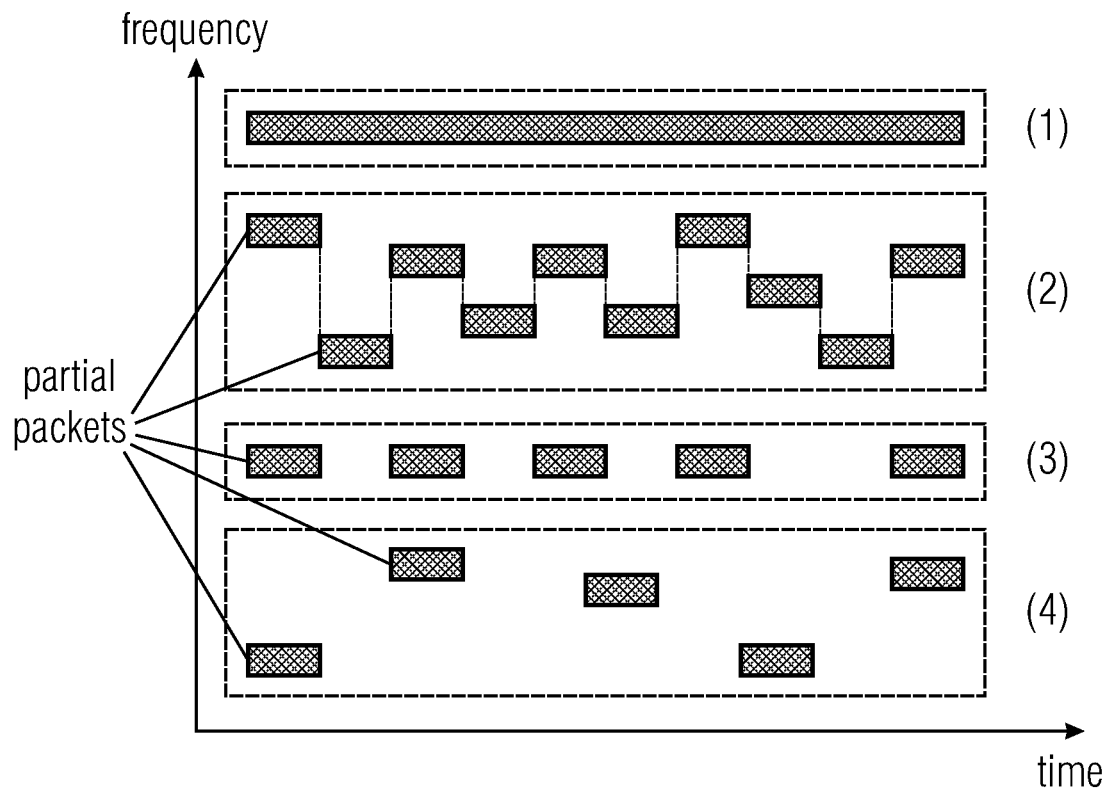
FIG. 7 shows, in a diagram, an occupancy of the transmission channel during transmission of data packets using four different transmission methods.

FIG. 7 shows in a diagram an occupancy of the transmission channel during transmission of data packets by using four different transmission methods. Here, in FIG. 7, the ordinate describes the frequency and the abscissa the time. In other words, FIG. 7 shows four possible methods for transmitting a single packet.

The first transmission method (case 1) includes continuous transmission of a data packet at constant frequency.

A second transmission method (case 2) includes continuous transmission of a data packet in connection with a frequency hopping method.

A third transmission method (case 3) includes discontinuous transmission of a data packet (telegram splitting) at constant frequency.

A first transmission method (case 4) includes discontinuous transmission of a data packet (telegram splitting) in connection with a frequency hopping method.

Embodiments of the data receiver 110 are relevant for all four methods when a plurality of data packets is to be received, when the data receiver 110 has to receive a plurality of data packets that are emitted by different data transmitters 100 asynchronously and at different frequencies within an assigned frequency band. Thereby, at the input, the broadband signal 120 has a significantly higher bandwidth than the partial data packets 142.

Embodiments of the data receiver 110 become particularly relevant in case 4 allowing a particularly high degree of parallel asynchronous packet transmissions. In this case, each partial data packet 142 includes its individual preamble. In the following, the time and frequency sequence of the partial data packets 104 will be referred to as (partial data packet) sequence. The throughput of the transmission system can be further increased when different data transmitters 100 use different sequences; thereby, the probability for collisions of the partial data packets 142 of different data transmitters 100 decreases.

Additionally, for cost reasons, frequency generators having a relatively high tolerance are used in the data transmitters 100. Thereby, a frequency offset that can be a plurality of the symbol rate $f_{sym}$ of the partial data packets occurs between data transmitter 100 and data receiver 110. Since this effect also reduces the probability for packet collisions, the maximum throughput of the transmission system can be increased further by specifically adding a stochastic component to the transmitting frequencies. Thereby, the transmitting frequencies in the data receiver 110 are basically unknown.

Detecting the data packets in the data receiver can take place with the help of the preambles in the partial data packets 142. Since the transmitting frequencies in the data receiver 110 are unknown, in embodiments, the assigned frequency bands can be split into overlapping channels to be processed in parallel with a filterbank (e.g. matched filterbank 132); hereby, the intervals $\Delta f_{MF}$ between the center frequencies of the individual channels may only be a fraction of the symbol rate $f_{sym}$ of the partial data packets 142. Values are, for example (e.g. typically) in the range $\Delta f_{MF}/f_{sym}=\frac{1}{4}\ldots\frac{1}{8}$. This results in the number $N_{CH}$ of the channels to be processed in parallel in connection with the bandwidth B of the assigned frequency band and the bandwidth $B_T$ of a partial data packet 142:

$$N_{CH}=(B-B_T)/\Delta f_{MF}=(4\ldots 8)\cdot(B-B_T)/f_{sym}$$

2.1 Structure of a Partial Data Packet

Figure 8:
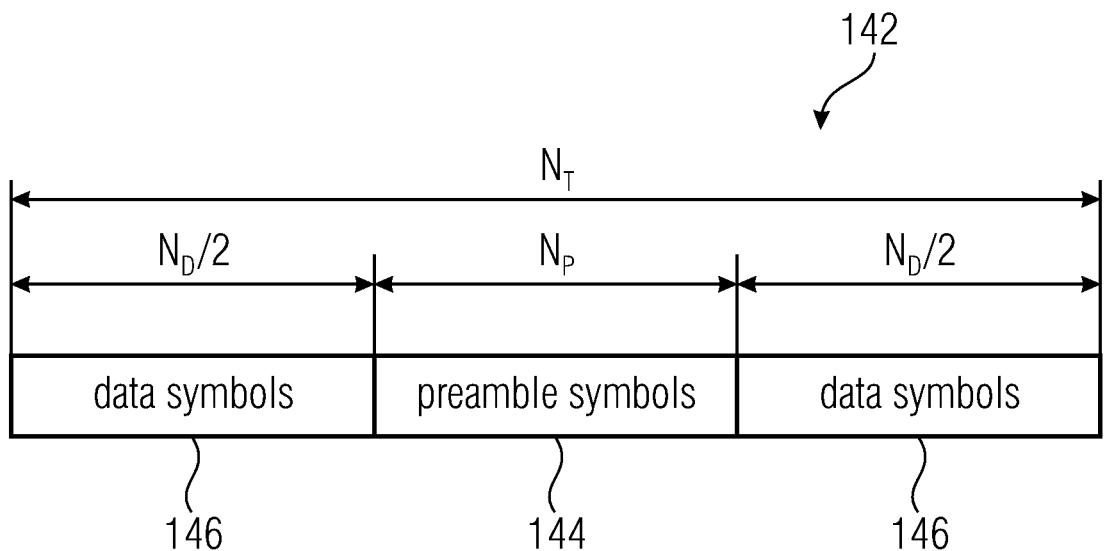
FIG. 8 is a schematic view of a structure of a partial data packet according to an embodiment.

FIG. 8 shows a schematic view of a structure of a partial data packet 142 according to an embodiment. The partial data packet 142 can include Np preamble symbols 144 and $N_D$ data symbols 146, wherein the preamble can be arranged in the center. The total number of symbols of a partial data packet 142 can be $N_T=N_P+N_D$.

Figure 9:
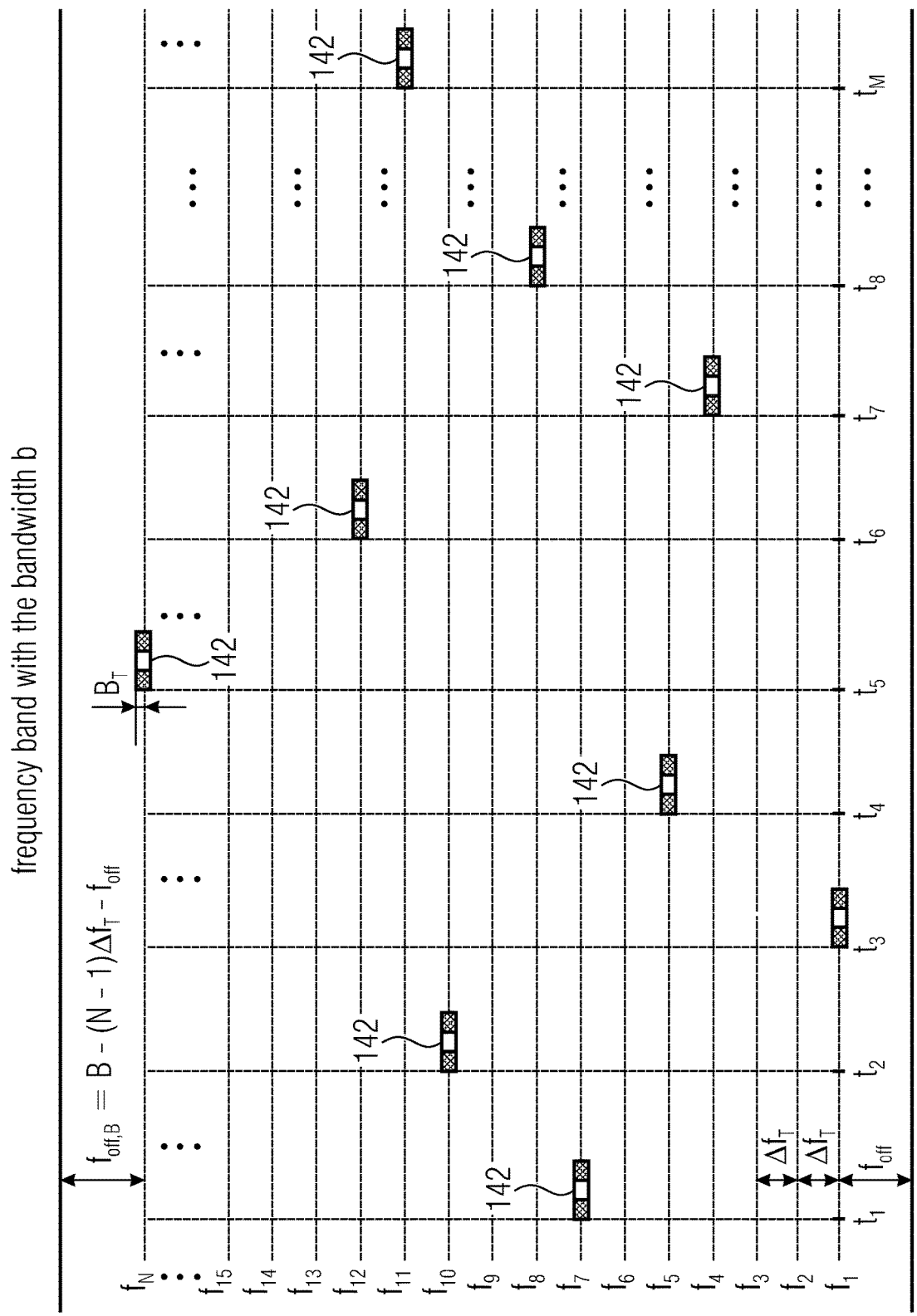
FIG. 9 shows, in a diagram, a time and frequency arrangement of the partial data packets of a data packet in the allocated frequency band with the bandwidth B.

A data packet can consist of M partial data packets 142 that are transmitted discontinuously. FIG. 9 shows in a diagram the time and frequency arrangement of the partial data packets 142 of a data packet in the assigned frequency band with the bandwidth B. Here, the ordinate describes the frequency and the abscissa the time.

The M instants $[t_1, t_2, \ldots, t_M]$ and the N carrier frequencies $[f_1, f_2, \ldots, f_N]$ can be freely selected. In practice, however, an equidistant raster having the step width $\Delta f_T$ can be used for the frequencies, since this facilitates signal generation in the data transmitter 100. Contrary thereto, the instants are not equidistant. The number N of carrier frequencies can be less than or equal to the number M of partial data packets 142. For N<M, individual carrier frequencies are used multiple times. However, this is no general limitation, the number N of carrier frequencies can also be greater than the number M of partial data packets 142. In this case, not all carriers are occupied during transmission.

The distance $f_{off}$ between the bottom end of the frequency band and the frequency $f_1$ is variable due to the inaccurate frequency generation in the data transmitters and the already stated stochastic component in the transmitting frequencies and can correspond, for example, at least to half the bandwidth $B_T$ of a partial data packet 142, so that the partial data packet with the carrier frequency $f_1$ is still completely within the frequency band. The resulting spacing $f_{off,B}$ between the frequency $f_N$ and the top end of the frequency band can also correspond, for example, at least to half the bandwidth $B_T$ so that the partial data packet 142 with the carrier frequency $f_N$ is still completely within the frequency band. From this follows, e.g.:

$$\min(f_{off})=B_T/2$$

$$\max(f_{off})=B-B_T/2-(N-1)\cdot\Delta f_T$$

The variation range of $f_{off}$ has, for example, a width of:

$$\Delta f_{off}=\max(f_{off})-\min(f_{off})=B-B_T-(N-1)\cdot\Delta f_T$$

The sequence Sp of a data packet can be defined, e.g., by the sequence of indices of the frequencies regarding the instants $[t_1, t_2, \ldots t_M]$. In FIG. 9, the following applies exemplarily:

$$S_P=[7, 10, 1, 5, (N), 12, 4, 8, \ldots, 11]$$

For N<M, individual indices occur several times.

When selecting the sequence of indices in the sequence Sp completely freely, a high computing effort in the packet correlator (multi-stage correlator) 122 results. In embodiments, sequences can be used that are made up of similar groups shifted in frequency. For this, the number M of partial data packets 142 can be represented as a product of the number $M_G$ of the partial data packets 142 of a group and the number $N_G$ of the groups:

$$M = N_G \cdot M_G$$

Thereby, the sequence correlation 127 illustrated in FIG. 6 can be split in a group correlation (second correlation stage 128) and a subsequent group sequence correlation (third correlation stage 129). The $M_G$ indices of the group $S_G$ can hereby assume values in the range of [1, ..., N–X ]. The $N_G$ values of the group sequence $S_{PG}$ can then assume values in the range [0, ..., X ], such that the addition of any value of the group $S_G$ and any value of the group sequence $S_{PG}$ results in a value in the range of [1, ..., N ]. By a suitable selection of parameters $M_G$, $N_G$ and X, the computing effort in the packet correlator (multi-stage correlator) 122 can be adapted. Possibly, $$X = N_G - 1$$

can be selected; thereby, the group sequence SPG can be selected such that the same includes all possible values exactly once. For $$X < N_G - 1$$

individual values occur several times within the group sequence.
Example:

$$N=20, M=24, M_G=3, N_G=8, X=7$$

$$S_G = [1, 13, 7]$$

$$S_{PG} = [0, 5, 3, 6, 1, 7, 4, 2]$$

$$\min(S_g) + \min(S_{PG}) = 1$$

$$\max(S_G) + \max(S_{PG}) = N = 20.$$

For the normalized bandwidth of the group and the group sequence, the following applies, e.g.:

$$B_{G,norm} = \max(S_G) - \min(S_G) = N - X - 1$$

$$B_{PG,norm} = \max(S_{PG}) - \min(S_{PG}) = X$$

$M_G < N_G$ can apply, i.e. the length of a group can be less than the number of groups. In that case, the computing effort decreases with decreasing value for X.

The spacing $\Delta f_T$ between adjacent frequencies can be related to the symbol rate $f_{sym}$:

$$\Delta f_T = M_\Delta \cdot f_{sym}.$$

For $M_\Delta$, for example, an integer value can be selected so that the frequency generation in the transmitters and receivers can be configured as simple as possible.

The instants $[t_1, t_2, \ldots, t_M]$ can be related to the instant $t_1$:

$$t_P = [\Delta t_1, \Delta t_2, \ldots, \Delta t_M] = [t_1, t_2, \ldots, t_M] - t_1 = [0, t_2 - t_1, \ldots, t_M - t_1].$$

The values can be selected such that for the intervals, pluralities of the symbol period $T_{sym} = 1/f_{sym}$ result. Thereby, integer values are obtained for the normalized intervals, $$T_P = t_P / T_{sym} = f_{sym} \cdot t_P = [0, n_2 n_3, \ldots, n_m].$$

This contributes again to simplifying the frequency generation in the transmitters and receivers (indication: frequency generation includes carrier frequency generation and clock frequency generation, wherein here clock frequency generation is meant and above the carrier frequency generation, wherein the term "frequency generation" is used as general term for both). By forming equal groups, here again splitting into a group $T_G$ having a length $M_G$ and a group sequence $T_{PG}$ having the length $N_G$ takes place.
Example:

$$M=12, M_G=3, N_G=4$$

$$T_P = [0, 33, 60, \underline{95}, 128, 155, \underline{188}, 221, 248, \underline{290}, 323, 350]$$

$$T_G = [0, 33, 60]$$

$$T_{PG} = [0, 95, 188, 290]$$

For reducing the probability for collisions of partial data packets 142 of different data transmitters 100, the transmitters can be divided into $N_S$ transmitter groups using different group sequences $S_{PG,i}$ and $T_{PG,i}$ with i=1 ... $N_S$. Thereby, the group sequence correlation takes place $N_S$ times in parallel. In that case, a lower value for the parameter X results in a particularly distinct reduction of the computing effort.

2.2 Structure of the Correlator

Figure 10:
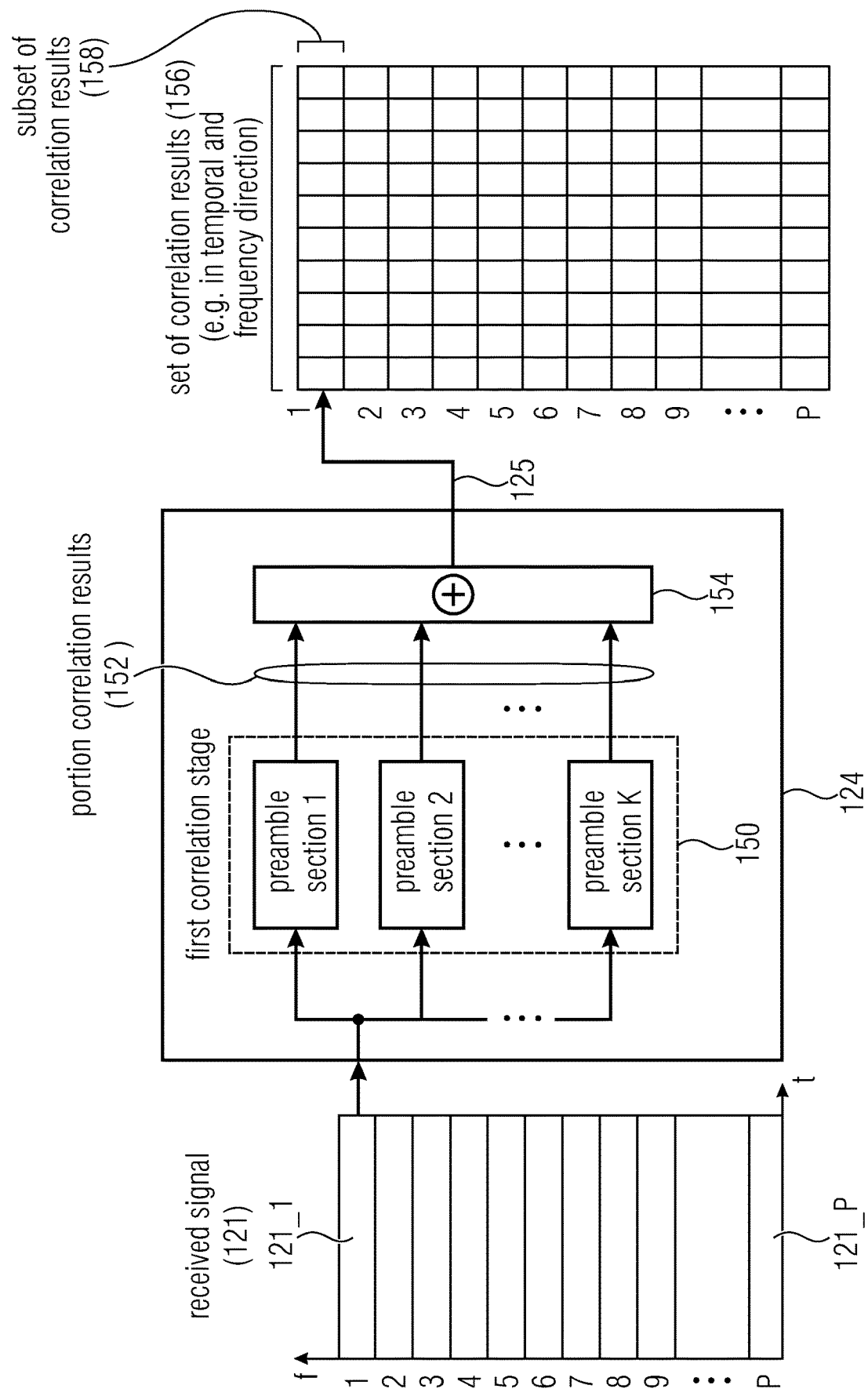
FIG. 10 is a schematic block diagram of a first correlation stage of the multi-stage correlator of the data receiver according to an embodiment.

FIG. 10 shows a schematic block diagram of a first correlation stage 124 of the multi-stage correlator 122 of the data receiver 110 according to an embodiment.

The first correlation stage 124 can be configured to correlate the received signal 121 or a version derived therefrom in the preamble portion correlation 150 with K preamble portions corresponding (e.g. matching) to different (e.g. overlapping or adjacent) portions of the preambles (=preamble portions) of the partial data packets 142 to obtain K portion correlation results 152 (e.g. portion correlation amplitudes), for example one portion correlation result (e.g. one correlation amplitude) per preamble portion. Further, the first correlation stage 124 can be configured to combine (e.g. to add or incoherently add (e.g. by forming the absolute value) the plurality of portion correlation results 152 (e.g. per sample) to obtain a first set of correlation results 156 (=correlation results 125) of the first correlation stage 124 for the received signal 121.

As indicated in FIG. 10, subband signals can be applied at the input of the first correlation stage P, wherein the first correlation stage 124 can be configured to correlate a subband signal (e.g. the subband signal 121_1) of P subband signals in the preamble portion correlation 150 with the K preamble portions to obtain K portion correlation results 152 (e.g. portion correlation amplitudes) for the subband signal (e.g. the subband signal 121_1) and to combine 154 the K portion correlation results 152 to obtain a set of correlation results 156 for the subband signal (e.g. the subband signal 121_1).

In embodiments, the first correlation stage 124 can be configured to correlate at least two subband signals of the P subband signals (e.g. several subband signals of the P subband signals or all subband signals of the P subband signals) each with the K partial preambles to obtain a subset of correlation results 158 (e.g. a one-dimensional array of (normalized) correlation amplitudes) for each subband signal of the at least two subband signals, wherein the first correlation stage 124 can be configured to provide a first set of correlation results 156 comprising the subsets of correlation results 158 as correlation result 125, for example, the first set of correlation results 156 can comprise the one-dimensional subsets of correlation results 158.

Thus, the first set of correlation results 156 of the first correlation stage 124 can be a two-dimensional array of correlation results, wherein a first dimension of the two-dimensional array of correlation results describes (e.g. a sequence of) sampling instants of the subband signals, wherein a second dimension of the two-dimensional array of correlation results describes the plurality of subbands.

Figure 11:
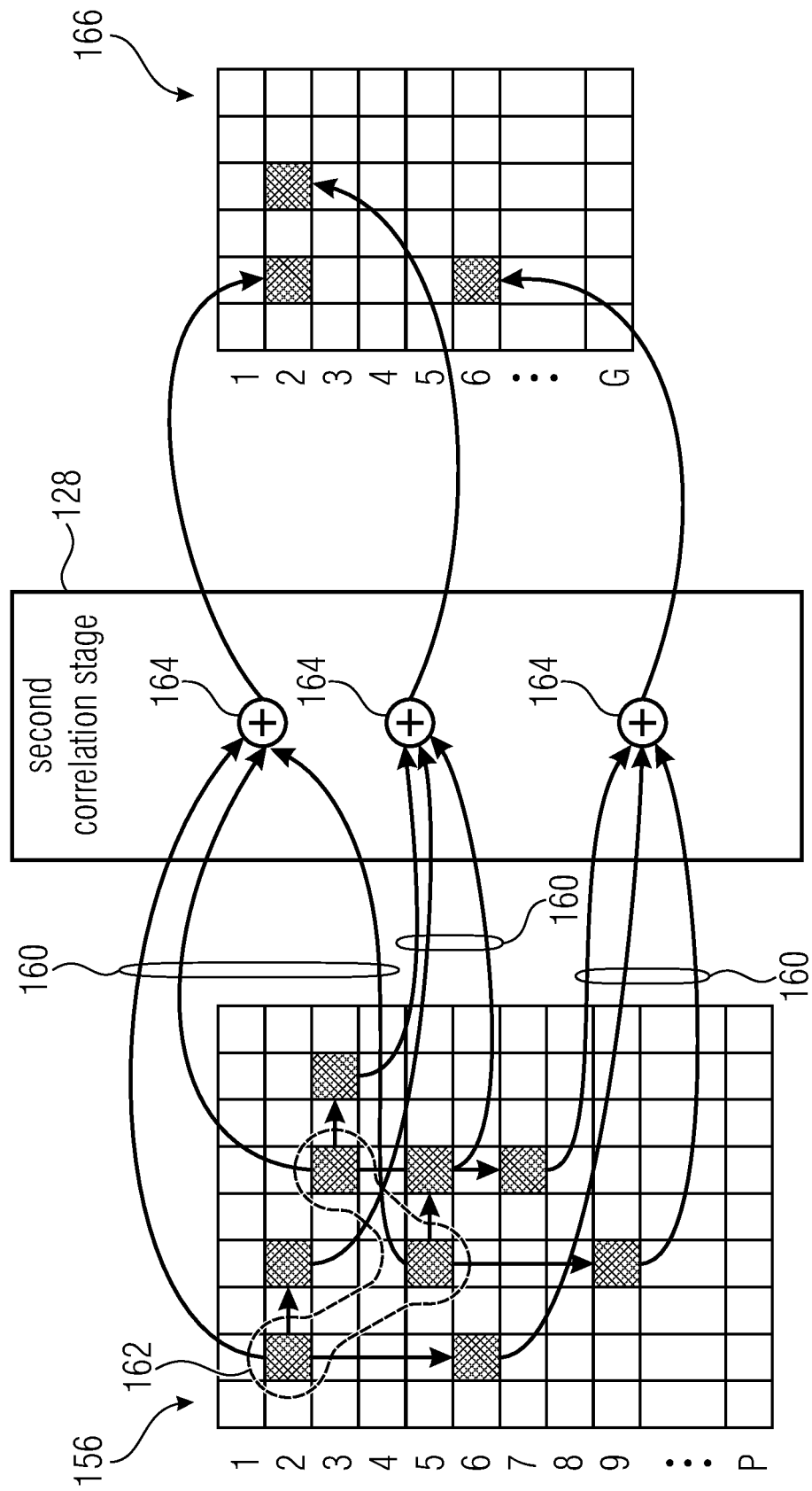
FIG. 11 is a schematic block diagram of a second correlation stage of the multi-stage correlator of the data receiver according to an embodiment.

FIG. 11 shows a schematic block diagram of the second correlation stage 128 of the multi-stage correlator of the data receiver 110 according to an embodiment.

As mentioned above, at least two groups of partial data packets 148_1 and 148_2 can comprise the same relative group hopping pattern 140_1, 140_2 in groups, for example such that partial data packets 142 of a first group of partial data packets have the same relative group hopping pattern as partial data packets 142 of a second group of partial data packets 148_2 (cf. FIG. 3).

The second correlation stage 124 can be configured to select and to combine in groups 146 (e.g. to add), from the first set of correlation results 156 (e.g. the two-dimensional array of correlation results) of the first correlation stage 124, groups of correlation results 160 based on a group correlation pattern 126 derived from the group hopping pattern 140_1, 140_2 to obtain a second set of correlation results 166 of the second correlation stage 128.

Here, the group correlation pattern 162 can indicate time intervals and frequency spacings of the correlation results of the two-dimensional array of correlation results 156 of the first correlation stage 124 that corresponds to the relative time intervals and frequency spacings of the group hopping pattern 140_1, 140_2 of the groups of partial data packets 142.

As can be seen in FIG. 11, the second correlation stage 124 can be configured to select the groups of correlation results 160 from the first set of correlation results 156 of the first correlation stage 124 in temporal and/or frequency direction based on the group correlation pattern 162.

The second set of correlation results 166 of the second correlation stage 128 can be a two-dimensional array of correlation results, wherein a first dimension of the two-dimensional array of correlation results 166 describes a temporal position of the group of partial data packets 142, wherein a second dimension of the two-dimensional array of correlation results 166 describes a frequency position of the group of partial data packets 142.

In the following, embodiments of the multi-stage correlator 122 comprising three correlation stages will be described. Here, the third correlation stage can essentially correspond to the second correlation stage 128, with the difference that the third correlation stage groups correlation results of the second correlation stage based on a group sequence correlation pattern instead of a group correlation pattern, wherein the group sequence hopping pattern indicates relative time intervals and frequency spacings between the groups of partial data packets 148_1 and 148_2 (cf. FIG. 3).

Figure 12:
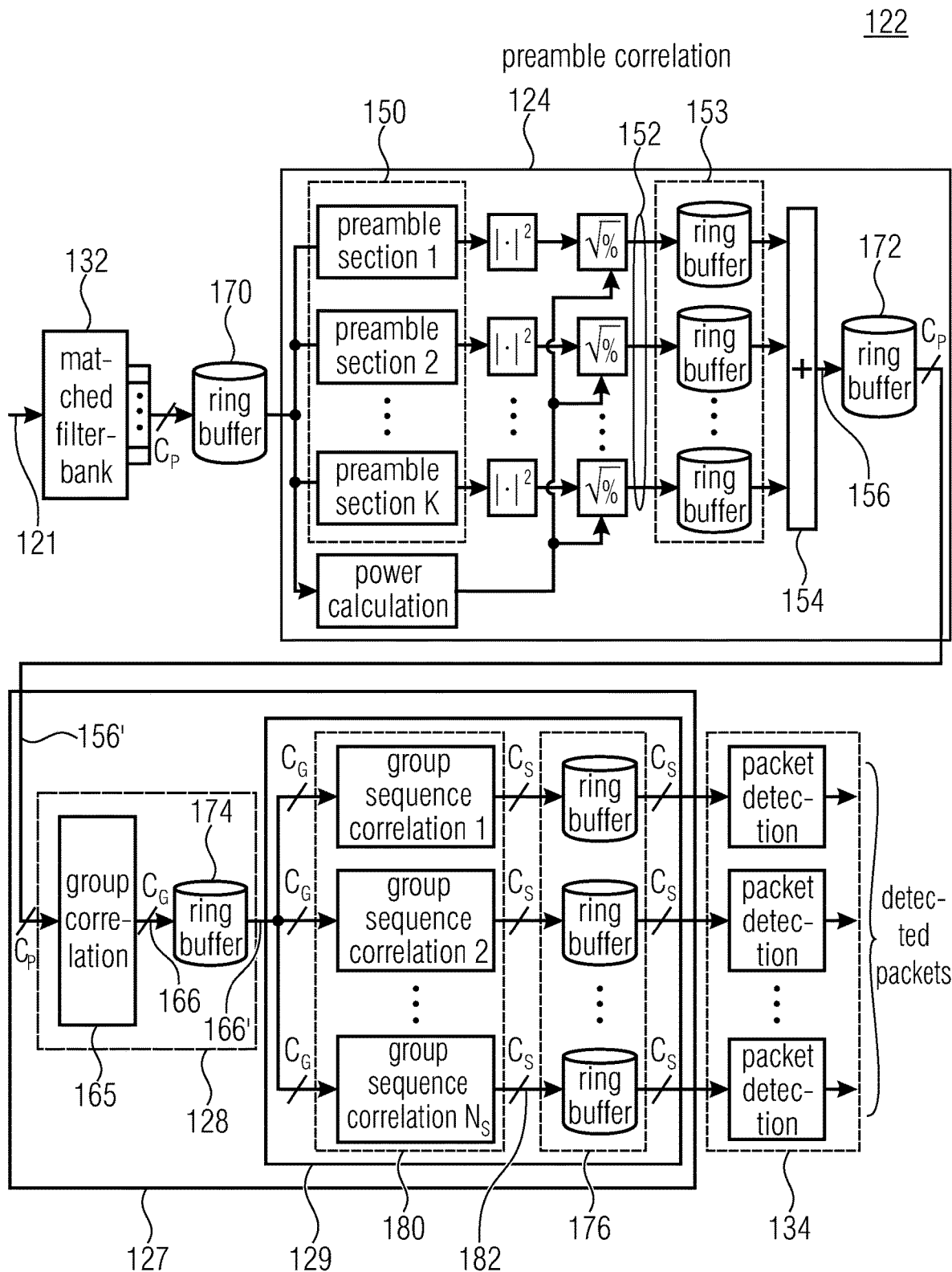
FIG. 12 is a schematic block diagram of a multi-stage correlator of a data receiver, wherein the multi-stage correlator comprises three correlation stages according to an embodiment.

FIG. 12 shows a schematic block diagram of a multi-stage correlator 122 of a data receiver 110 according to an embodiment. The multi-stage correlator 122 includes three correlation stages, in detail, a first correlation stage 124 (cf. FIG. 10), a second correlation stage 128 (cf. FIG. 11) and a third correlation stage 129. Here, the first correlation stage 124 can perform preamble correlation, while the second 128 and the third 129 correlation stages perform sequence correlation 127.

The input signal 121 of the multi-stage correlator 122 can comprise P subband signals. The P subband signals can be obtained, for example, by the filterbank (e.g. matched filter) 132.

It should be noted that the P subband signals applied to the input of the multi-stage correlator 122 are based on the broadband signal 120 (see FIG. 6) but that it is insignificant how the broadband signal 120 applied to the antenna of the data receiver 110 (e.g. "in the air") is split into the P subband signals. This can be performed, for example, with the filterbank 132 shown in FIG. 12, but also with P narrowband receivers or a broadband receiver and another type of splitting.

The multi-stage correlator 132 can comprise a first cache (e.g. ring buffer) 170 that can be configured to cache the P subband signals (e.g. provided by the filterbank 132).

The first correlation stage 124 can be configured to correlate the P subband signal into which the broadband signal 110 is split each with the K preamble portions and the preamble portion correlation 150 to obtain K portion correlation results 152 (e.g. portion correlation amplitudes) for the respective subband signal. Further, the first correlation stage 124 can be configured to normalize the K portion correlation results 152 in dependence on a determined (e.g. calculated across several subbands) power p[n]. For example, the first correlation stage 124 can be configured to normalize the portion correlation results 152 by forming squares of the absolute value, a division by the determined power p[n] and a calculation of the roots of the quotients. Further, the first correlation stage 124 K can comprise queue caches (e.g. ring buffer) 153 that can be configured to cache the respective portion correlation results 152, wherein the plurality of queue caches 153 can comprise different memory lengths, wherein the memory lengths of the K queue caches 153 can depend on the respective preamble portions of the preambles of the partial data packets 142. Further, the first correlation stage 124 can be configured to combine (e.g. to add) the K portion correlation results 152 cached in the K queue caches 153 to obtain a subset of correlation results 158 for each of the subband signals and to provide a first set of correlation results 156 comprising the subsets of correlation results 158 for the P subbands. Further, the first correlation stage 124 can comprise an (e.g. two-dimensional) output queue cache (e.g. ring buffer) 172 that can be configured to cache the first set of correlation results 156 of the first correlation stage 124.

The second correlation stage 128 can comprise a group correlation 164 that can be configured to select and to combine in groups (e.g. to add), from the first set of correlation results 156' of the first correlation stage 124 cached in the output queue cache (e.g. ring buffer) 172, groups of correlation results based on a group correlation pattern to obtain a second set of correlation results 166. The second correlation stage 128 can comprise an (e.g. two-dimensional) output queue cache (e.g. ring buffer) 174 that can be configured to cache the second set of correlation results 166 of the second correlation stage 128.

A third correlation stage 129 can comprise a group sequence correlation 180 that can be configured to select from the second set of correlation results 166' of the second correlation stage 128 cached in the output queue cache (e.g. ring buffer) 174 groups of correlation results based on a group sequence correlation pattern and to combine them in groups (e.g. to add the same) to obtain a third set of correlation results 182. Further, the third correlation stage 129 can comprise an (e.g. two-dimensional) output queue cache (e.g. ring buffer) 176 that can be configured to cache the third set of correlation results 182 of the third correlation stage 129.

In embodiments, the third correlation stage 129 can be configured to provide the correlation results in a form suitable for subsequent packet detection 134.

As indicated in FIG. 12, the third correlation stage can be configured to detect $N_s$ sequences of partial data packets. For this, the group sequence correlation 108, the output queue cache 176 and the packet detection can be configured $N_s$ times.

In other words, FIG. 12 shows a schematic view of the structure of the packet correlator 122 including the embedding into the preceding matched filterbank 132 and the subsequent packet detection. The packet correlator 122 includes the following three parts:

1. Preamble correlation (first correlation stage 134)
2. Group correlation (second correlation stage 128)
3. Group sequence correlation (third correlation stage 129)

Ring buffers for storing the intermediate results are arranged between the individual processing blocks. The depth of the ring buffers is given by the processing length of the subsequent processing block. Therefore, no further buffers for intermediate results are included in the processing blocks themselves.

For preamble correlation, the preamble can be divided into K portions of the length $L_K$ that are each normalized individually and subsequently added. The portions can be overlapping or non-overlapping. For this, a value in the range of $1 \ldots L_K$ can be selected for the shift $D_K$ between the individual portions. For $D_K = L_K$, non-overlapping portions will be obtained. For $N_P$ preamble symbols the following context is obtained:

$$L_K + (K-1) \cdot D_K = N_P$$

FIG. 13 shows a schematic view of an exemplary division of a preamble 190 according to an embodiment. The preamble 190 includes 12 preamble symbols 144, wherein, according to a first example, the preamble 190 is divided into three non-overlapping portions 192 of four preamble symbols 144 each, and wherein, according to a second example, the preamble 190 is divided into five overlapping portions 192 of four preamble symbols 144 each.

By the division into portions 192 and their separate normalization, the interference resistance against impulse-like interferences can be significantly improved. Additionally, the division allows a reduction of the number $C_P$ of channels to be processed in parallel (e.g. by reducing the overlapping of the subband signals, i.e. by reducing oversampling $M_F$ in frequency direction).

In embodiments, as a result of the preamble correlation 124, normalized real valued correlation amplitudes result, which result from adding the respective values of the individual portions. The temporal shift of the results of the initial portion can take place by respective selection of the depths of the ring buffers following the normalization. Since the correlation takes place exclusively in temporal direction, the number $C_P$ of channels remains unchanged.

In embodiments, in the group correlation 128, the normalized correlation amplitudes of the $M_G$ preambles of the partial data packets 142 can be added in a group. This can take place by means of the temporal structure described by $T_G$ and the frequency structure described by $S_G$ of a group. Since correlation is also performed in frequency direction, the number of channels is reduced from $C_P$ to $C_G$.

In embodiments, in the group sequence correlation, the normalized correlation amplitudes of the $N_G$ groups of a sequence can be added. This can take place by means of the temporal structure described by $T_{PG,i}$ and the frequency structure described by $S_{PG,i}$ of the respective group sequence. Since correlation in frequency direction is performed here as well, the number of channels is reduced from $C_G$ to $C_S$.

2.3 Number of Channels

The number of channels in the preamble correlation can correspond to the number of relevant channels (subband signals), e.g. the relevant channels of a matched filterbank:

$$C_P = N_{CH} = M_F \cdot (B - B_T)/f_{sym}$$

Here, B is the bandwidth of the band, $f_{sym}$ is the symbol rate and $M_F$ is the oversampling factor in frequency direction. The factor $M_F$ can be adapted to the length $L_K$ of the portions of the preamble correlation. In order to provide sufficient sensitivity for packets that are located at unfavorable positions with regard to the frequency raster of the subband signals that can be provided, for example by a matched filterbank 132, the following can apply in a conventional implementation:

$$M_F \geq 2 \cdot L_K$$

A method for reducing the factor $M_F$ to lower values will be described below.

In the group correlation, the number of channels can be reduced to:

$$C_G = M_F \cdot (B - B_T - B_G)/f_{sym}$$

Here, $$B_G = B_{G,norm} \cdot \Delta f_T = B_{G,norm} \cdot M_\Delta \cdot f_{sym}$$

can be the bandwidth of the group. From this follows, for example:

$$C_G = C_P - M_F \cdot M_\Delta B_{G,norm}$$

In the group sequence correlation, the number of channels is reduced, for example to:

$$C_S = M_F \cdot (B - B_T - B_G B_{PG})/f_{sym}$$

Here, $B_G$ can be the already stated bandwidth of the group and $$B_{PG} = B_{PG,norm} \cdot \Delta f_T = B_{PG,norm} \cdot M_\Delta \cdot f_{sym}$$

can be the bandwidth of the group sequence. From this follows, e.g.:

$$C_S = C_P - M_F \cdot M_\Delta \cdot (B_{G,norm} + B_{PG,norm})$$

Between the normalized bandwidths and the number N of carrier frequencies, there is the following connection:

$$B_{G,norm} + B_{PG,norm} = N - 1$$

Thereby, the following results, e.g.:

$$C_S = C_P - M_F \cdot M_\Delta \cdot (N-1)$$

The number of channels $C_S$ can correspond to the value $\Delta f_{off}$ by which the carrier frequencies of the partial data packets 142 can vary without exceeding the assigned frequency band:

$$\Delta f_{off} = (B - B_T) - (N-1) \cdot M_\Delta \cdot f_{sym} = C_S \cdot f_{sym}/M_F$$

The following table (table 1) includes the parameter values for two examples. Regarding the structure of a data packet, the two examples only differ by the carrier interval $\Delta f_T$. In both examples, the relative bandwidth of a group has been selected such that the number of channels is significantly reduced by the group correlation. This is particularly important in example 2.

| Parameter | Formula symbol | Example 1 | Example 2 |
|---|---|---|---|
| Bandwidth of the band | B | 100 kHz | 725 kHz |
| Bandwidth of a partial packet | $B_T$ | 5 kHz | 5 kHz |
| Symbol rate | $f_{sym}$ | 2.5 kBd | 2.5 kBd |
| Relative spacing of the carrier frequency | $M_\Delta$ | 1 | 12 |
| Spacing of the carrier frequencies | $\Delta f_T$ | 2.5 kHz | 30 kHz |
| Oversampling in frequency direction | $M_F$ | 8 | 8 |
| Number of carrier frequencies | N | 24 | 24 |
| Normalized bandwidth of a group | $B_{G,\,norm}$ | 16 | 16 |
| Normalized bandwidth of a group sequence | $B_{PG,\,norm}$ | 7 | 7 |
| Number of channels in the preamble correlation | $C_P$ | 304 | 2304 |
| Number of channels after group correlation | $C_G$ | 176 | 768 |
| Number of channels after group sequence correlation | $C_S$ | 120 | 96 |
| Variation range of the carrier frequencies | $\Delta f_{off}$ | 37.5 kHz | 30 kHz |

2.4 Process of Correlation

The correlation can take place with a temporal oversampling factor $M_T$, i.e. the sampling rate of all signals is, e.g.:

$$f_S = M_T f_{sym}$$

For example, $M_T=2$ can be used.

Figure 14:
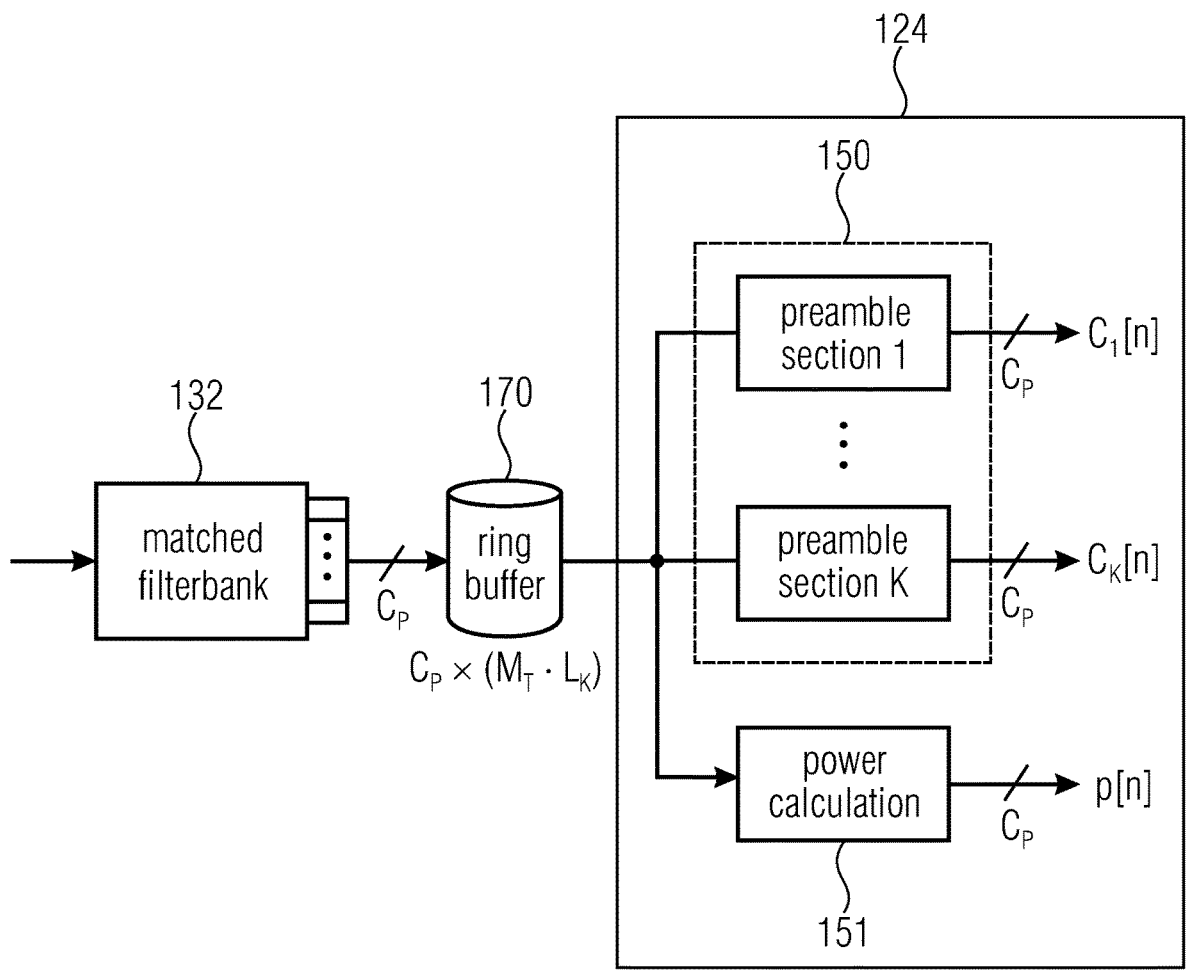
FIG. 14 is a schematic block diagram of a section of the first correlation stage shown in FIG. 12 as well as the filterbank (e.g. matched filterbank) and cache (e.g. ring buffer) upstream of the first correlation stage according to an embodiment.

FIG. 14 shows a schematic block diagram of a section of the first correlation stage 124 shown in FIG. 12 as well as the provision of the subband signals upstream of the first correlation stage 124 that takes place exemplarily with a filterbank (e.g. matched filterbank) 132 and the cache (e.g. ring buffer) 170 according to an embodiment. In other words, FIG. 14 shows the signals and the ring buffer 170 of the preamble section correlation 150. The ring buffer 170 can have the size $CP \times (M_T \cdot L_K)$.

Figure 15:
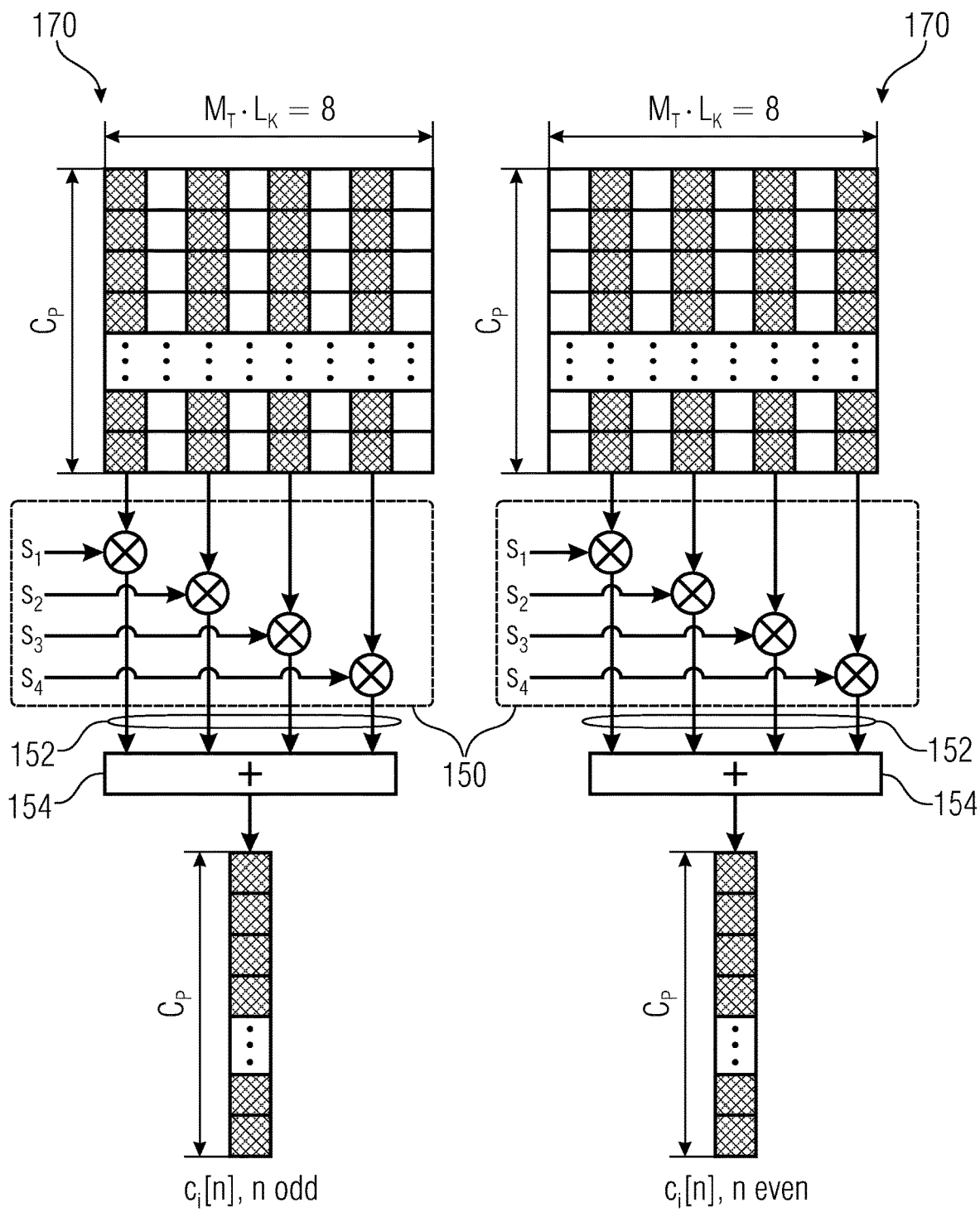
FIG. 15 is a schematic view of the preamble portion correlation of the subband signals cached in the ring buffer performed by the first correlation stage including the combination of the portion correlation results according to an embodiment.

FIG. 15 shows a schematic view of the preamble portion correlation of the subband signals cached in the ring buffer performed by the first correlation stage including the combination of the portion correlation result according to an embodiment.

As can be seen in FIG. 15, the correlation takes place parallel across all $C_P$ channels; here, for the case $M_T=2$, the odd or even columns can be evaluated alternately. As reference symbols $s_1, \ldots, S_4$ (according to an embodiment with $L_K=4$), the preamble symbols belonging to the respective portion can be used in $L_{K-Z}$ cyclical manner, such that in connection with cyclical data transmission of the samples of the subband signals which can, for example correspond to the output values of a matched filterbank 132 into the ring buffer 170 results in the desired correlation.

Alternatively, $M_T$ subsequent columns of the ring buffer can be combined to a column with $M_T \cdot C_P$ elements. Then, the ring buffer 170 has the size $(M_T \cdot C_P) \times L_K$. The correlation can now take place in parallel across $M_T \cdot C_P$ channels, and can provide output values for each channel $M_T$. Accordingly, on the input side, $M_T$ samples of the subband signals that can correspond, for example, to $M_T$ output vectors of a matched filterbank can be combined to one column in the ring buffer.

The values of the ring buffer can be stored in the memory column by column, i.e. starting with the values of the first column and ending with the values of the last column. Thereby, the variations $C_P \times (M_T \cdot L_K)$ and $(M_T \cdot C_p) \times L_K$ are equivalent in the memory.

The power calculation 151 illustrated in FIG. 14 follows the same process, but here, instead of multiplication with the reference symbols, the square of the absolute values is calculated.

Subsequently, the correlation signals $c_1[n], \ldots, c_K[n]$ can be normalized, by:
 forming the squares of the absolute value
 dividing by the powers $p[n]$;
 calculating the roots of the quotients.

Figure 16:
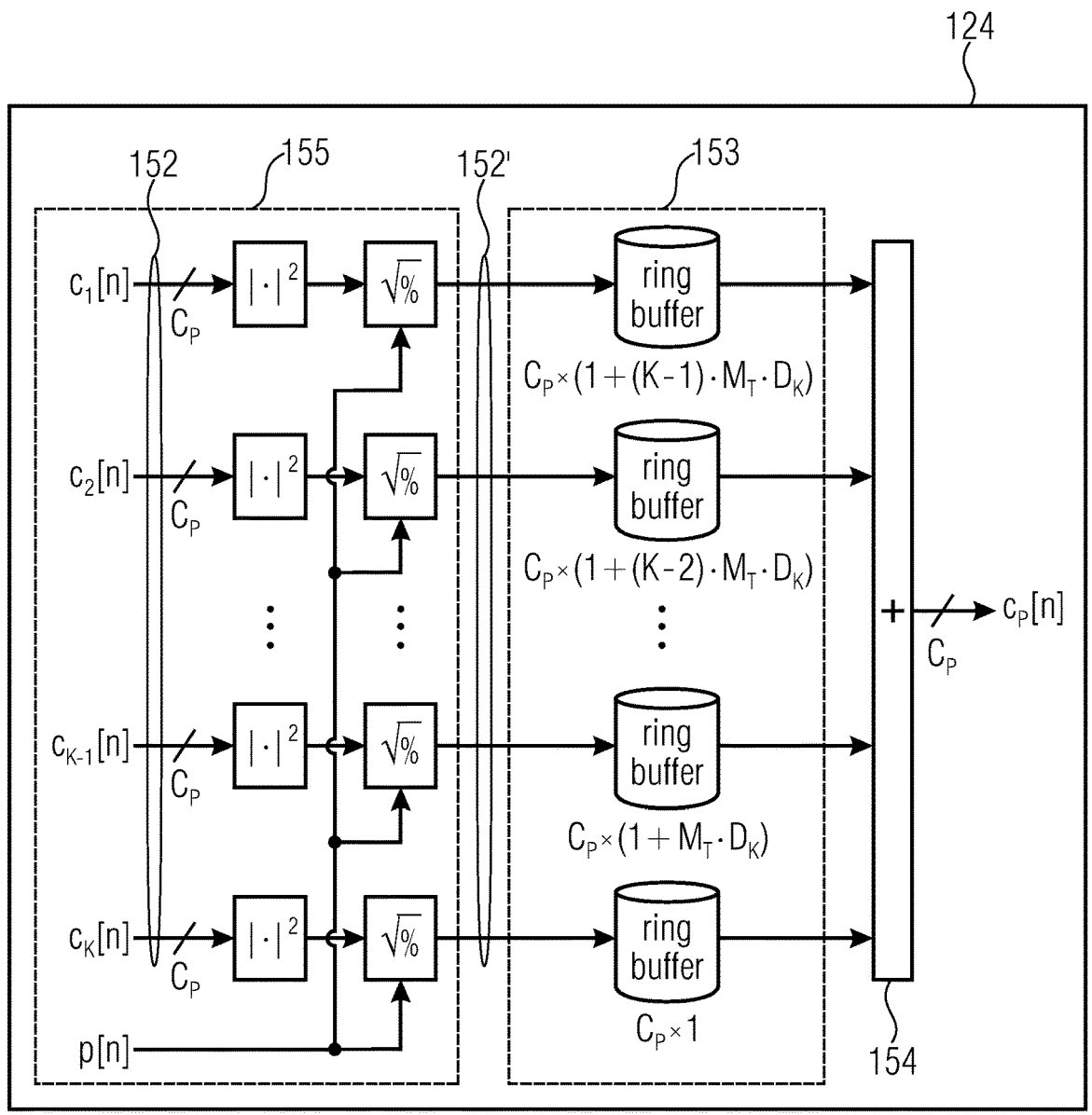
FIG. 16 is a schematic block diagram of a section of the first correlation stage shown in FIG. 12 according to an embodiment.

FIG. 16 shows a schematic block diagram of a section of the first correlation stage 124 shown in FIG. 12 according to an embodiment. As can be seen in FIG. 12, the first correlation stage 124 can be configured to perform normalization 155 of the portion correlation results 152 to obtain normalized portion correlation results 152'. Further, the first correlation stage 124 can be configured to cache the normalized portion correlation results 152' in the queue caches 153 and to combine 154 (e.g. to add) the normalized portion correlation results 152' cached in the queue caches 153.

In other words, FIG. 16 shows the normalization 155 and the subsequent addition of the results of the portions. Here, ring buffers 153 can be used as delay members to delay the results according to the temporal structure of the portions. The ring buffer of the first portion has the greatest delay with $$D_1 = (K-1) \cdot M_T \cdot D_K$$

while the ring buffer of the last portion only serves as intermediate buffer without delay.

Figure 17:
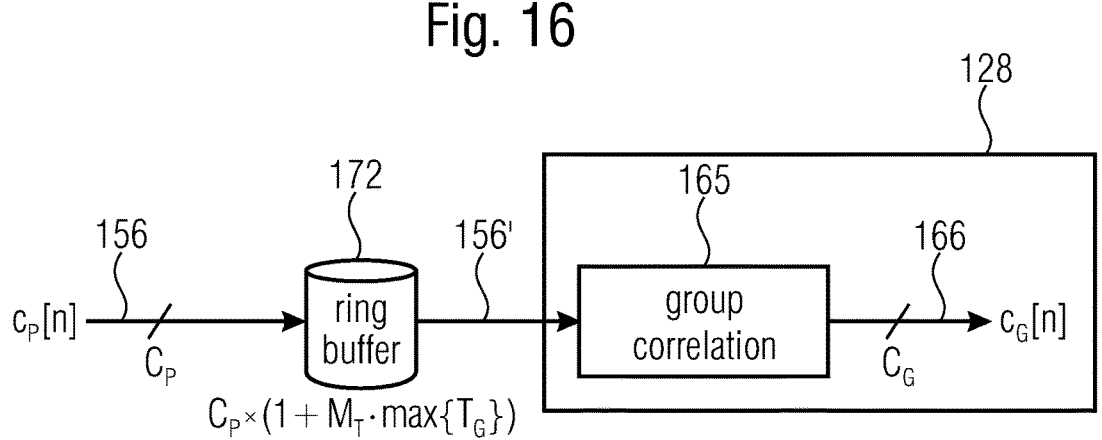
FIG. 17 is a schematic block diagram of the second correlation stage according to an embodiment.

FIG. 17 shows a schematic block diagram of the second correlation stage 128 of the multi-stage correlator 122 of the data receiver according to an embodiment. The second correlation stage 128 can be configured to perform a group correlation 165 of the first set of correlation results 156' cached in the output queue cache (e.g. ring buffer) 172 of the first correlation stage 124 to obtain a second set of correlation results 166. In other words, FIG. 17 shows the signals and the ring buffer of the group correlation.

Figure 18:
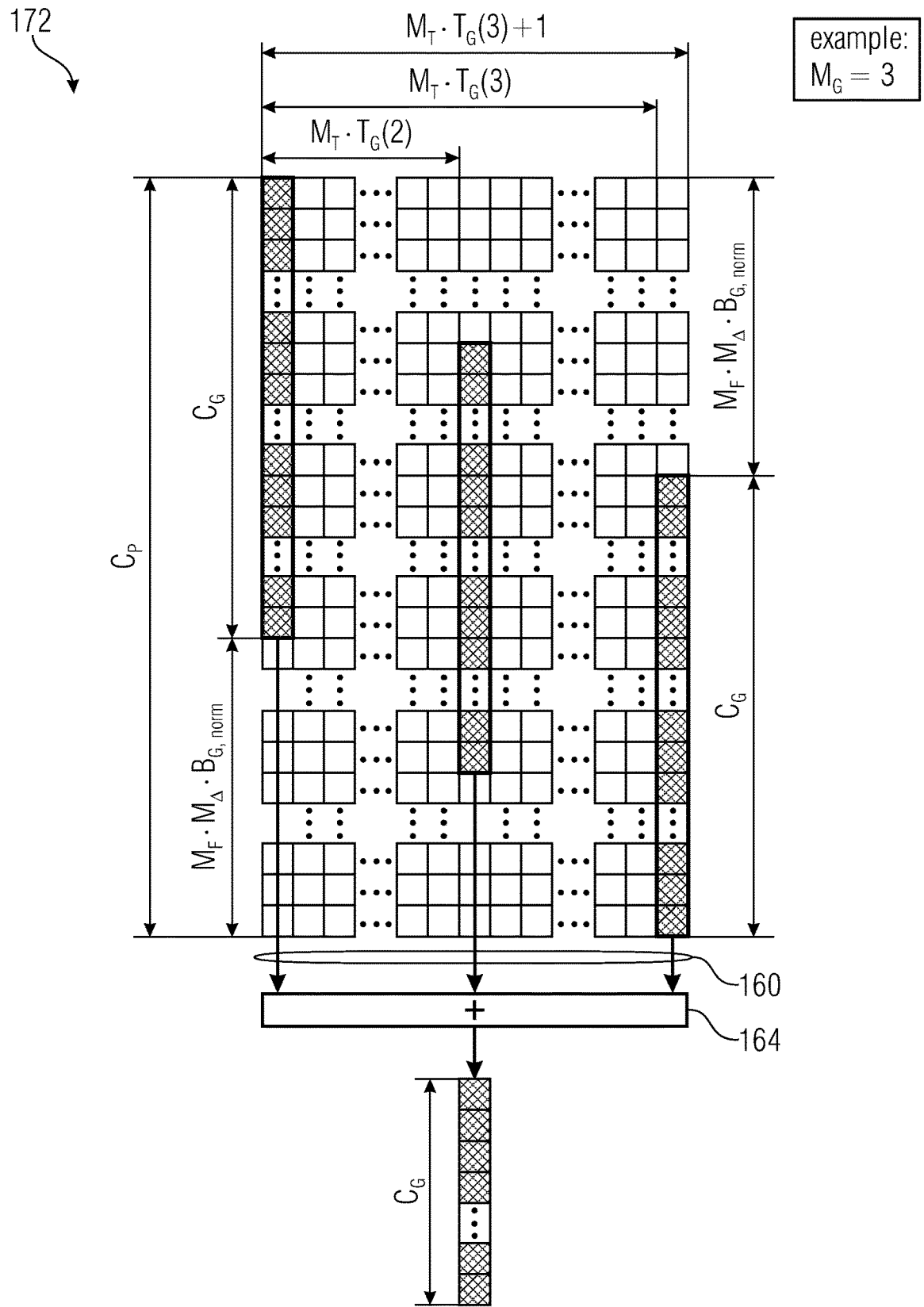
FIG. 18 is a schematic view of the group correlation performed by the second correlation stage based on the first correlation results cached in the output queue cache of the first correlation stage according to an embodiment.

FIG. 18 shows a schematic view of a two-dimensional memory structure of the output queue cache (e.g. ring buffer) 172 of the first correlation stage 124 and the group correlation 165 performed by the second correlation stage 128, wherein groups of correlation results 160 are selected and combined in groups 164 based on the group correlation pattern from the first set of correlation results cached in the output queue cache (e.g. ring buffer) 172 of the first correlation stage 124.

In other words, FIG. 18 shows the process of the group correlation 165. According to the ring buffer operation, the $M_G$ partial gaps to be added pass horizontally cyclically through the ring buffer, with $C_G$ values each. As already described, the number of channels within the group correlation is reduced from $C_P$ to $C_G$. This reduction is the greater the greater the normalized bandwidth $B_{G,norm}$ of the group.

Figure 19:
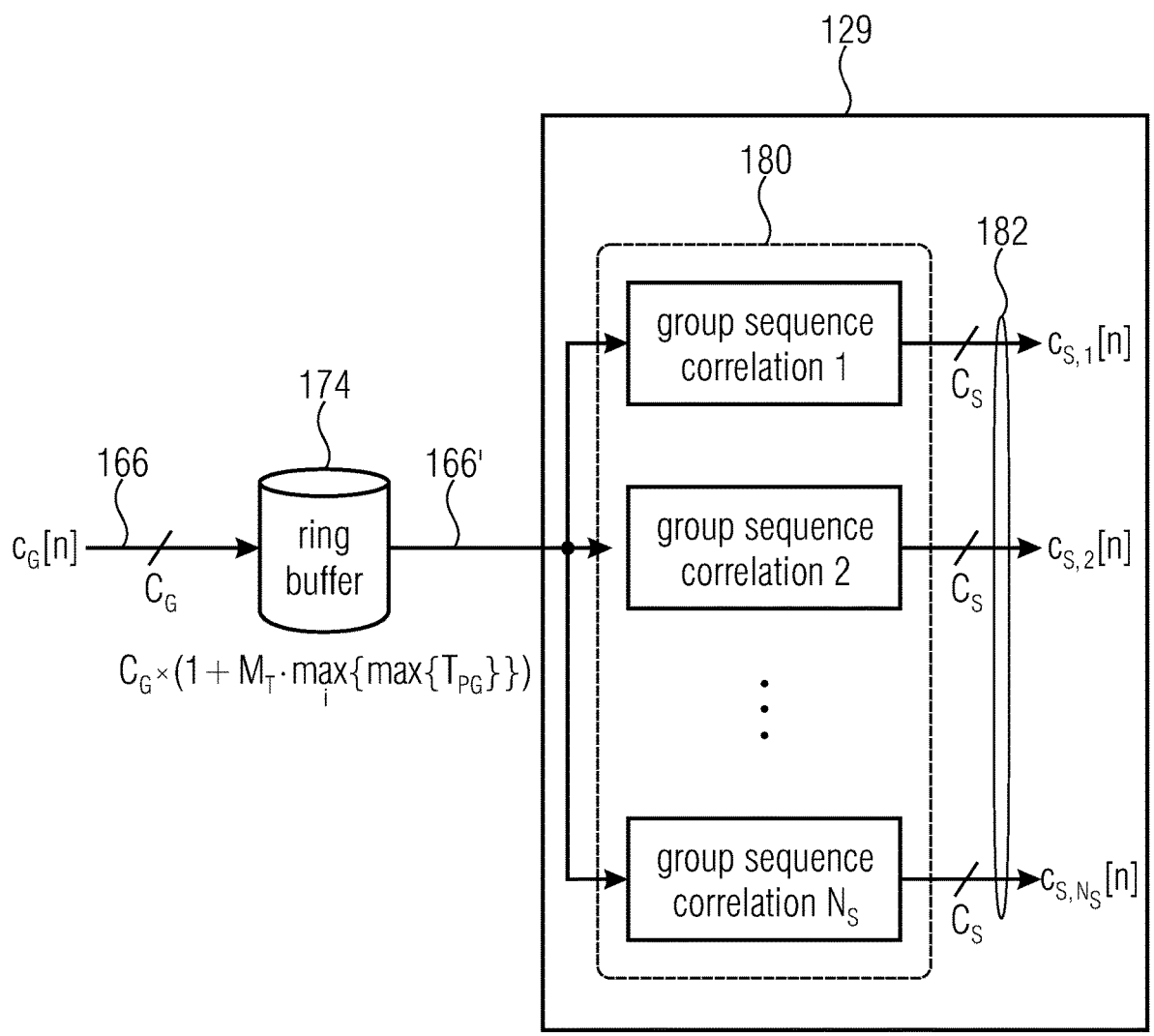
FIG. 19 is a schematic block diagram of a section of the third correlation stage shown in FIG. 12 according to an embodiment.

FIG. 19 shows a schematic block diagram of a section of the third correlation stage 129 shown in FIG. 12, according to an embodiment. The third correlation stage 129 can be configured to perform group sequence correlation 180 of the second set of correlation results 166' cached in the output queue cache (e.g. ring buffer) 174 of the second correlation stage 128 to obtain a third set of correlation results 182. As indicated in FIG. 19, the third correlation stage 129 can be configured to detect $N_s$ sequences of partial data packets 142. For this, the group sequence correlation 180 can be configured $N_s$ times.

In other words, FIG. 19 shows the signals and the ring buffer of the group sequence correlation. The process is performed basically in the same way as in the group correlation, but here the same relates to the $N_G$ groups of the respective group sequence with the parameters $S_{PG,i}$ and $T_{PG,i}$ with i=1 . . . $N_S$. As already described, within the group sequence correlation, the number of channels can be reduced from $C_G$ to $C_S$. This reduction is the greater the greater the normalized bandwidth $B_{PG,norm}$ of the group sequence. The $N_S$ output signals $c_{S,1}[n], \ldots c_{S,N_S}[n]$ form the output signals of the packet correlator. 2.5 Usage of Several Groups For reducing the probability of collisions of the partial data packets 142 of different data transmitters further, alternatively, several groups can be used. In this case, the part with the group correlation 165 shown in the bottom part of FIG. 12 and the subsequent group sequence correlations 180 exists several times.

2.6 Method for Reducing the Number of Channels

The spacing between the center frequencies of the $C_P$ channels (subband signals) which can correspond, for example, to the channels of a matched filterbank are, e.g.:

$$\Delta f_{MF} = f_{sym}/M_F$$

Thereby, the frequency offset $\Delta f$ between the actual receiving frequency of a partial data packet and the center frequency of the closest subband signal that can correspond, e.g., to the closest channel of a matched filterbank, can be limited to the range:

$$\Delta f = \pm \Delta f_{MF}/2 = \pm f_{sym}/(2 \cdot M_F)$$

For the error in correlation of the portions of the preamble caused by the frequency offset not becoming too large, the following can apply:

$$M_F \geq 2 \cdot L_K$$

Here, $L_K$ is the length of a portion of the preamble. Then, for the examples with $L_K=4$ shown in FIG. 13, a bottom limit of $M_F=8$ results. In this case, the frequency offset is in the range:

$$\Delta f = \pm f_{sym}/16$$

Figure 20:
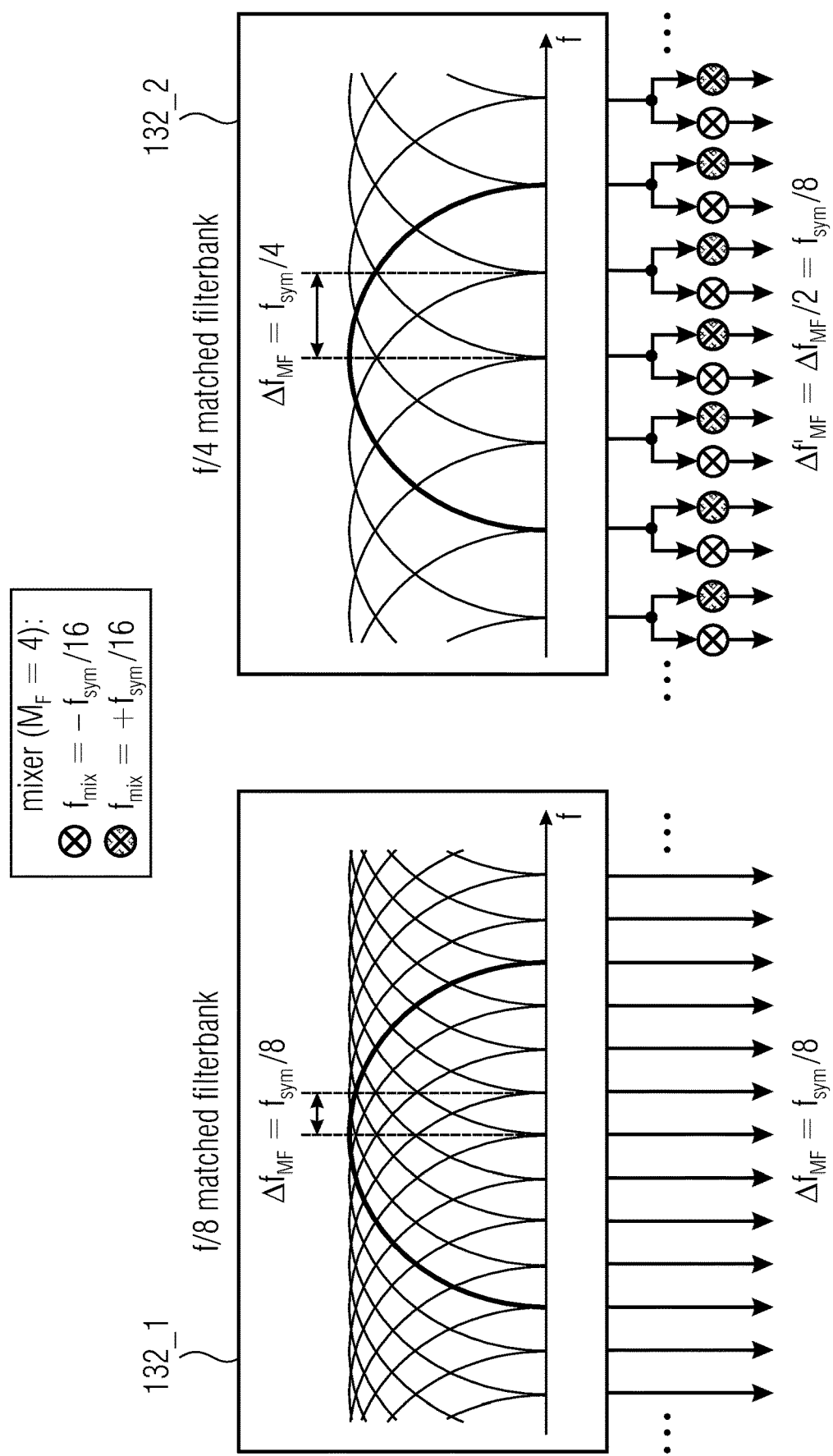
FIG. 20 is a schematic view of a reduction of the number of channels of the matched filterbank by an f/8 matched filterbank and an f/4 matched filterbank according to an embodiment.

The error in the preamble correlation acts as a limiting factor. Regarding the matched filtering that can be performed, e.g., with a matched filterbank, a greater frequency offset in the range of $$\Delta f = \pm f_{sym}/8$$

or, with reduced power, above that can be tolerated. FIG. 20 shows how these circumstances can be used for reducing the number of channels, i.e. the number of subband signals, which can be performed, e.g. by reducing the number of channels of a matched filterbank 132.

In the following, it is assumed that the subband signals can be provided by a matched filterbank since this is an advantageous configuration in practice. Basically, the same can be provided with any method that can provide a set of equal subband signals for further processing. In other words, the type of providing the subband signals is not relevant for processing.

In detail, FIG. 20 shows a schematic view of a reduction of the number of channels of a matched filterbank 132 from an f/8 matched filterbank 132_1 to an f/4 matched filterbank 132_2. As can be seen in FIG. 20, every second filter of the f/8 matched filterbank can be omitted and the outputs of the resulting f/4 matched filterbank can be shifted by $\pm f_{sym}/16$ with two mixers each, such that a frequency raster as in an f/8 matched filterbank results. With this measure, the computing effort in the matched filterbank 132 can be reduced approximately by half.

Figure 21:
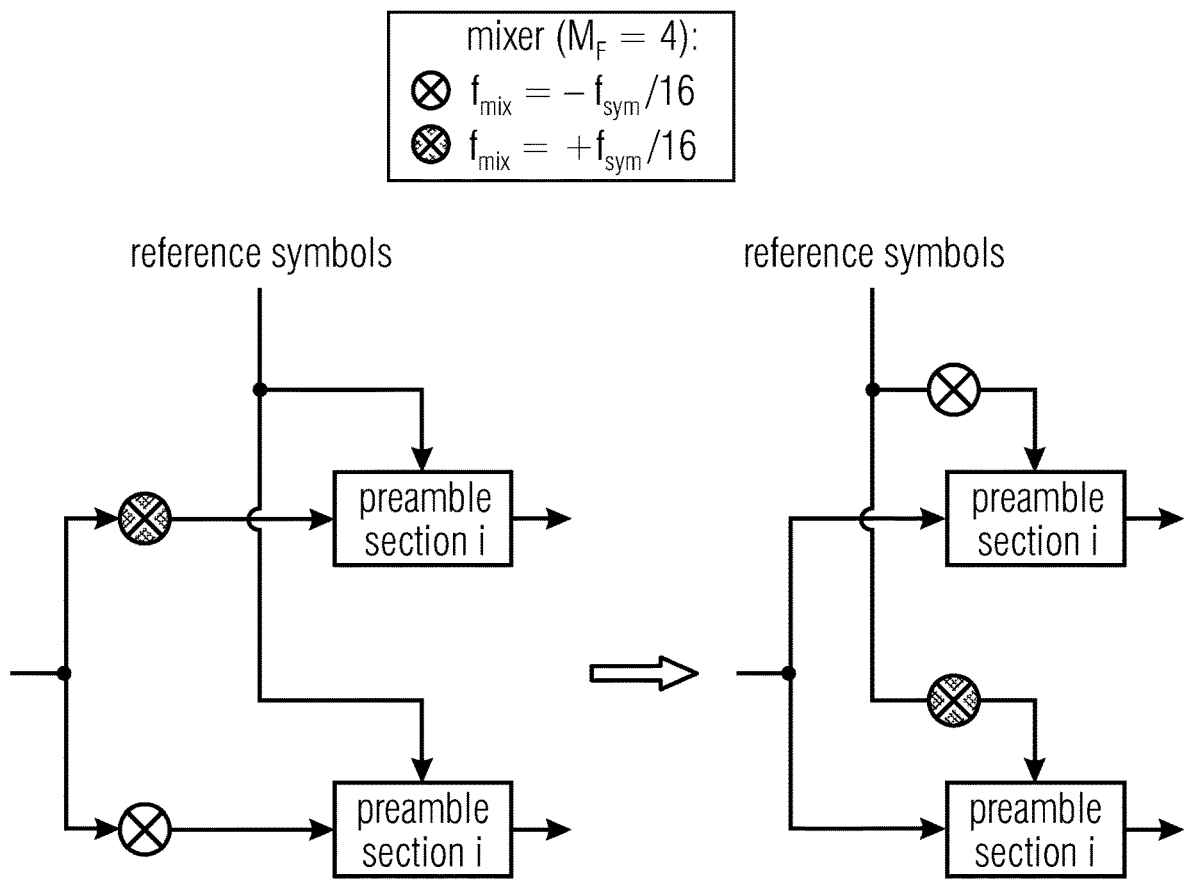
FIG. 21 is a schematic view of a portion correlation with the preambles rotated with respective mixing frequencies or their portions as reference symbols.

In combination with the subsequent preamble portion correlation, the mixers after the f/4 matched filterbank 132_2 can be omitted by using two different preambles or their portions as reference symbols that are rotated with the respective mixing frequencies in the correlation. This is shown in FIG. 21 for an individual channel. This procedure is not equivalent with respect to the complex-valued result of the correlation, but in further processing, only the square of the absolute value of the result is needed such that the deviation has no effect. Rotation of the reference symbols takes place once during initialization of the components.

A further option of reduction results from the determination that the high frequency resolution of the preamble correlation is not mandatory for the subsequent group and group sequence correlation. Therefore, between preamble correlation and group correlation, a maximum can be calculated across adjacent channels and the number of channels can be reduced accordingly.

Figure 22:
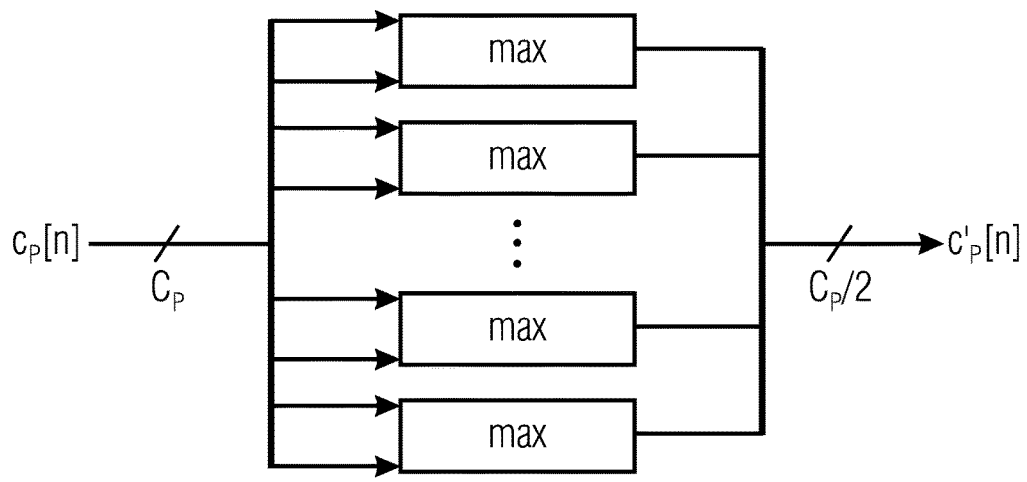
FIG. 22 is a schematic view of calculating a maximum between the first correlation stage and the second correlation stage of the data receiver according to an embodiment.

However, this measure results in an increase of the error detection probability in the packet detection following the packet correlator, such that normally only two adjacent channels can be combined. This case is illustrated in FIG. 22.

Figure 23:
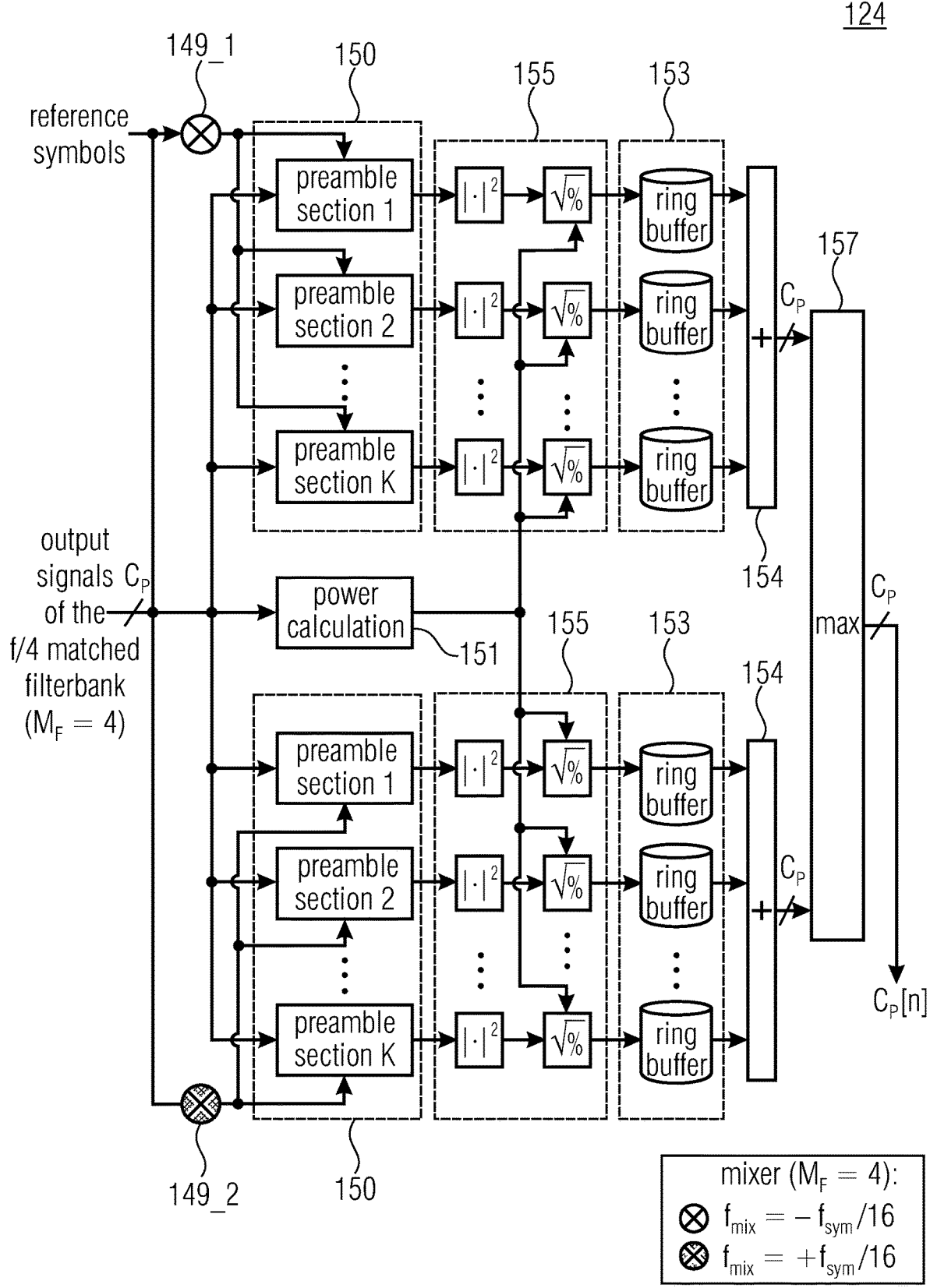
FIG. 23 is a schematic block diagram of a first correlation stage of the data receiver according to a further embodiment.

If both measures are combined—halving the number of channels at the input or in the matched filterbank 132 and halving the number of channels after the preamble correlation by forming the maximum across two adjacent channels each—the preamble correlation with a reduced number of channels illustrated in FIG. 23 results.

FIG. 23 shows a schematic block diagram of the first correlation stage 124 according to a further embodiment. The first correlation stage 124 is configured to shift a subband signal provided by the f/4 matched filterbank by means of two mixers by $\pm f_{sym}/16$ and to perform a preamble portion correlation 150 each for the $\pm f_{sym}/16$ shifted versions of the subband signal to obtain preamble portion results, and to perform normalization 155 of the preamble portion results to obtain normalized preamble portion results, and to cache the normalized preamble portion results in the queue caches 153, and to combine 154 the cached normalized preamble portion results to obtain a correlation intermediate result for the versions of each subband signal shifted by $\pm f_{sym}/16$, and to calculate a maximum 157 of the correlation intermediate results to obtain a correlation result for each subband signal.

Compared to the embodiment shown in FIG. 12, all numbers of channels ($C_P$, $C_G$ and $C_S$) can be reduced by the factor 2 due to the usage of $M_F=4$ instead of $M_F=8$ without the frequency resolution of the preamble correlation decreasing. Due to the parallel processing with rotated reference symbols, the effective number of channels in the preamble correlation is now $C'_P = 2 \cdot C_P$.

A further reduction of the number of channels prior to preamble correlation by selecting $M_F < 4$ is normally not possible, since in this case the frequency offset $\Delta f$ in the matched filterbank can assume values that cause a very distinct symbol distortion; thereby, the results are corrupted so much that the power significantly decreases. In specific cases where tradeoffs cannot be avoided with respect to the computing effort, this might have to be taken into account.

In contrary, a further reduction of the number of channels after preamble correlation by calculating a maximum across more than two adjacent channels is possible when the higher error detection probability in connection therewith can be tolerated. Here, the determining factor is the relative computing effort in the individual components of the preamble correlator. In practice, the computing effort in preamble correlation is frequently significantly higher than in the group and the group sequence correlation. In that case, reducing the number of channels after preamble correlation would only insignificantly reduce the computing effort.

3. Further Embodiments

In radio communication systems without coordination (such as in the ALOHA method), the data transmitter emits its packet at any time. Here, the receiver has no or only inaccurate knowledge on the transmitting instant when the transmission begins. This instant has to be determined in the receiver by means of detection.

3.1 Multi-Stage Detection in Preamble Splitting

Classical systems use the preamble of transmission for detecting the data packets in the data receiver. The same is normally transmitted in one piece and can thus be detected quite easily with classical correlation.

By the telegram splitting method or in a time or frequency hopping method, the preamble is typically divided into several partial portions.

If this divided sequence is to be detected, it is advantageous to compute the correlation together across all sequence parts, which involves a very high computing effort.

Embodiments of the present invention go a different way where the correlation is divided into several partial correlations and subsequently the partial results are combined to an overall result. A prerequisite of this method can be, for example, that the sequence is the same in all partial portions. If this is given, the correlation can be divided into a preamble correlation, an (optional) group correlation and a group sequence correlation as described in section 2.

By using the group and the group sequence correlation, there is the option that several different hopping patterns are detected that reduce the susceptibility to failure of the transmission. If in the case of several hopping patterns, the sequence in the partial portions is selected to be the same for all patterns, only a single preamble correlator is needed.

By this method, the needed computing power of the detector decreases significantly. Thereby, a more cost-effective hardware can be used or the number of supported hopping patterns can be increased.

In embodiments, the correlator does not only consist of a single-stage correlator, at least two correlators exist, wherein the second correlator operates based on the results of the first correlator. The results in the stages can be cached (e.g. in a database or a ring buffer).

In embodiments, first, correlation can be performed across the preamble sequence portions. These results can subsequently be combined to a group result in a second correlator. Then, based on the group correlation, the group sequence correlation can be performed, which provides the overall result for the detection.

If the above-described prerequisite that all partial portions have the same pilot sequence is not fulfilled, the above-described method can still be applied when there are only very few sequences (proportionally less sequences than partial packets).

In this case, there are v parallel preamble correlations, wherein v is the number of different sequences. It is not mandatory that the different sequences have the same length.

In the next step of partial correlation, the results can be loaded from the memories of the different preamble correlations and combined according to the hopping pattern. Further processing takes place analogously to the above-described method.

In embodiments, the first correlation stage comprises at least two parallel correlators.

In embodiments, in the second correlation step, the results can be loaded from the several correlators of the first stage and can be combined according to the hopping pattern.

3.2 Optimized Preamble Correlation

The ideas described in the following subchapters are described based on the preamble correlation of section 3.1. The same apply, however, generally for all systems that use a preamble for detection, even in the case where only one continuous preamble exists in the telegram/packet.

3.2.1 Normalizing the Correlation Results for Interference Suppression

In FIG. 13, it is shown at the example of a preamble with 12 symbols how the performance of the correlation can be increased with regard to frequency offsets by splitting the preamble into partial portions that are individually correlated and subsequently incoherently added.

This idea for improving the correlation results under frequency offsets has already been discussed extensively in [3] and [4].

In a typical system where no interference occurs, the threshold can be selected after the correlation based on the background noise. By the length of the correlation, additional noise averaging is performed, which limits the number of erroneous detections at a suitable threshold. All correlation values above the threshold represent, with a very high probability, the beginning of a transmitted data packet. The higher the receiving power of the transmitted data packet at the data receiver, the higher the correlation value and, hence, the probability that a data packet has been transmitted.

If interferences by other participants (the same or a foreign network) can occur during the transmission, the above-described approach can only be used to a very limited extent since the interference influences the result of the correlation and the value at this position is typically above the threshold of the following packet detection. Thus, at these locations, the data receiver erroneously assumes a detection. This presents, in particular, a problem when the receiving power of the interferer is significantly greater than the noise since then the correlation also provides a relatively high result.

This can be remedied by normalizing the correlation results to the received (estimated) interference. In that way, the amounts of the individual partial data packets can be weighted according to the estimated interference. Thereby, disturbed partial data packets have less influence than partial data packets without interference.

Generally, for normalization, a non-linear function is needed. This can represent, for example, as described above, weighting the amounts according to the estimated interference.

In embodiments, normalization of the partial packets to the estimated interference can be performed. This normalization can either take place prior to correlation or also after correlation.

A more specific example of this normalization is the normalization of the correlation results to the received signal power. For this, squares of the absolute value are formed for all symbols of the preamble and subsequently the sum is calculated.

This sum is divided by the square of the absolute value of the correlation result, wherein then the root is extracted from the quotient, which represents the normalized correlation result. By this normalization, all packets arriving at the data receiver (e.g. base station) have a correlation value of one (in an ideally received pilot sequence without noise and interference) or less.

Instead of calculating the square of the absolute value and subsequent root extraction, approximation can also be performed, these are, for example, abs(I)+abs(Q)

Newton Rapson method 1/sqrt(X)

Approximation of absolute values and adding squared versions of the absolute values If an interference occurs, the correlation result is also normalized to the received signal power. Since the received symbols generally deviate from the expected preamble sequence during the interference, the correlation result is significantly lower than with a non-interfered signal.

Thus, the normalization has the effect that the correlation result is significantly below one and hence the probability of error detection decreases.

As an alternative for calculating the square of the absolute value of the correlation result, division of the correlation result can also be performed directly by the root of the determined signal power.

The normalization can still take place prior to correlation. For this, the signal power is calculated as above and then the root is extracted. This result is applied to each input symbol by means of division.

In embodiments, normalization of the correlation result can be performed on the received signal power of the preamble. This can be performed by several options.

If data symbols exist prior and/or after the received preamble, these data symbols can also be (partly) incorporated in the power calculation. Thus, the number of symbols used for determining the power is greater than the number of preamble symbols for the correlation.

In embodiments, the determination of the received signal power can be performed across at least one data symbol.

The above methods have assumed a correlation without division into partial portions as in FIG. 13. In order to be able to perform normalization also in that case, individual normalization can take place for each partial portion. After normalization, the partial portions can be added as usual.

For determining the power for normalization of the partial areas, there are two options:

1. Separate determination of the power for each partial area

2. Common determination of the power for all partial areas

In both variations, as above, either the same number of symbols as for the correlation can be used, or again, adjacent symbols are incorporated.

In embodiments, separate normalization of the partial areas of the correlation can be performed. Here, the power can either be determined individually for each partial portion or the power can be determined together.

If a multi-channel detector is used as in the case of section 2, normalization can be performed separately for each channel. If it is assumed that interferences occupy at least two of the channels, the power can also be determined together for at least two channels.

In embodiments, in a multi-channel receiver, normalization can also be performed in parallel on all channels, wherein the power can also be determined across several channels.

3.2.2 Delay Structure with Ring Buffers

When using a separate correlation for the portions, results from different instants can be added depending on the temporal position of the sequence.

One option for obtaining this is calculating the correlation for all involved instants prior to adding. Under some circumstances, this may have the disadvantage that the preceding buffer structure (in this case the output of the filterbank) has to store the input data for the entire correlation period.

A solution for preventing this problem is to create a buffer structure for the partial correlation results.

Thereby, only the data for the length of the partial correlation may be stored at the input.

At the output, n ring buffers can be used for the n partial correlations. By the length of each ring buffer, the time dependency between the partial correlations can be established. This means the length of the buffer determines the duration of the delay.

For calculating the total correlation result, the respective oldest entries of all ring buffers can be added before the same are discarded in the next step.

In embodiments, instead of a large buffer at the input of the (partial) correlation, a buffer structure at the output of the partial correlations can be used. By the length of the respective buffers, the time delay (see FIG. 16) is realized.

3.2.3 Reduction of the Number of Channels at the Input of the Packet Correlator

In systems where the frequency offset (arbitrary and/or systematic offset) between the data transmitter and data receiver can be a plurality of the symbol rate, a multi-channel correlator may be used.

For being able to perform the parallel correlation on the channels, a preceding filterbank generating the symbols for each channel can be used.

Due to the connection between the (partial) correlation length and the maximum allowable frequency offset between two channels (see section 2), a large number of channels that have to be calculated and stored in the filterbank result.

As described in section 2, this limitation applies to the multi-channel correlator and not to the preceding filterbank. This is illustrated graphically in FIG. 20 based on the frequency response of the filter.

If oversampling of the filterbank in frequency direction is reduced to a certain degree and the frequency resolution subsequently is reestablished by a frequency shift of the symbols prior to correlation, this has little to no influence on the performance of the correlation. However, the computing power requirements and memory requirements of the filterbank and the following memory are reduced by the selected factor.

In embodiments, the filterbank of the multi-channel correlator can have a different frequency oversampling than the subsequent correlator. For increasing the frequency resolution in the correlator, the symbols of the filterbank can be multiplied with a complex exponential oscillation (corresponds to a digital frequency shift), wherein the choice of the exponential oscillation depends on the frequency offset.

Instead of multiplying the input data with the exponential oscillation, the reference sequence can also be multiplied with the exponential oscillation. This results in an individual reference sequence for each frequency offset, but the multiplication effort in each computing step is omitted.

In embodiments, an individual reference sequence can be used for each frequency line to be generated from the data of the filterbank, wherein the adapted reference frequency is generated from the original reference sequence by means of multiplication with the respective exponential oscillation.

3.2.4 Reduction of the Number of Channels at the Output of the Packet Correlator A further option of reducing the channels results from the finding that the high frequency resolution of the preamble correlation is not needed for the subsequent group and group sequence correlation.

Therefore, calculating a maximum across adjacent channels can be performed between the preamble correlation and the group correlation and the number of channels can be reduced accordingly. However, this measure results in an increase of the error detection probability in the packet detection following the packet correlator, such that usually only two adjacent channels can be combined. This case is illustrated in FIG. 22.

By calculating a maximum and discarding the smaller value(s), the number of channels can be reduced after the first correlation stage, which results in less computing effort and smaller memories.

In embodiments, after calculating the preamble correlation, calculating a maximum across adjacent channels can be performed. For further processing, the smaller value(s) is/are discarded.

4. Further Embodiments

Figure 24:
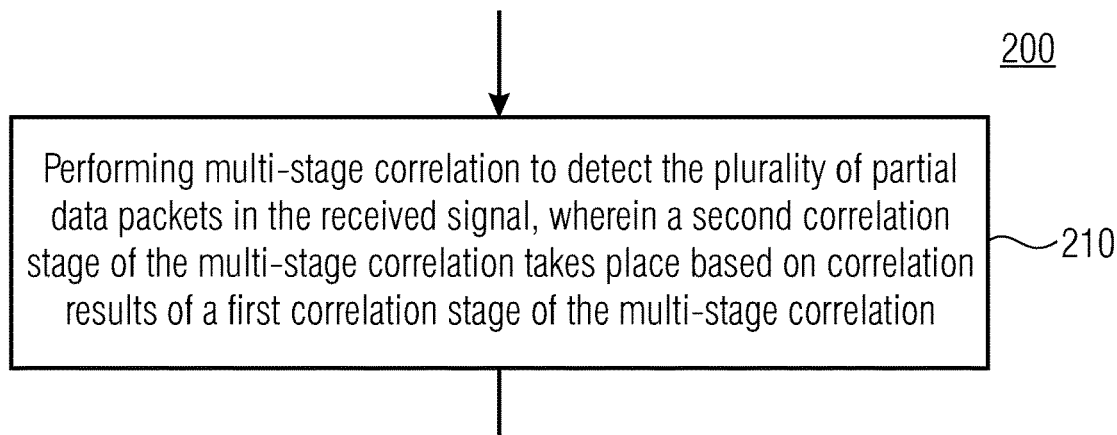
FIG. 24 is a flow diagram of a method for receiving a signal according to an embodiment.

FIG. 24 shows a flow diagram of a method 200 for receiving a signal, wherein the signal comprises a plurality of partial data packets [e.g. distributed in time and frequency according to a hopping pattern], wherein the plurality of partial data packets each comprise part of a data packet. The method 200 includes a step 202 of performing multi-stage correlation [e.g. of the received signal (e.g. in a first correlation stage) and a rendered (e.g. by the first correlation stage) version of the received signal (e.g. in a second correlation stage)] to detect the plurality of partial data packets [e.g. based on preambles of the same] in the received signal, wherein a second correlation stage of the multi-stage correlation takes place based on correlation results [e.g. based on the rendered version of the received signal] of a first correlation stage of the multi-stage correlation.

Figure 25:
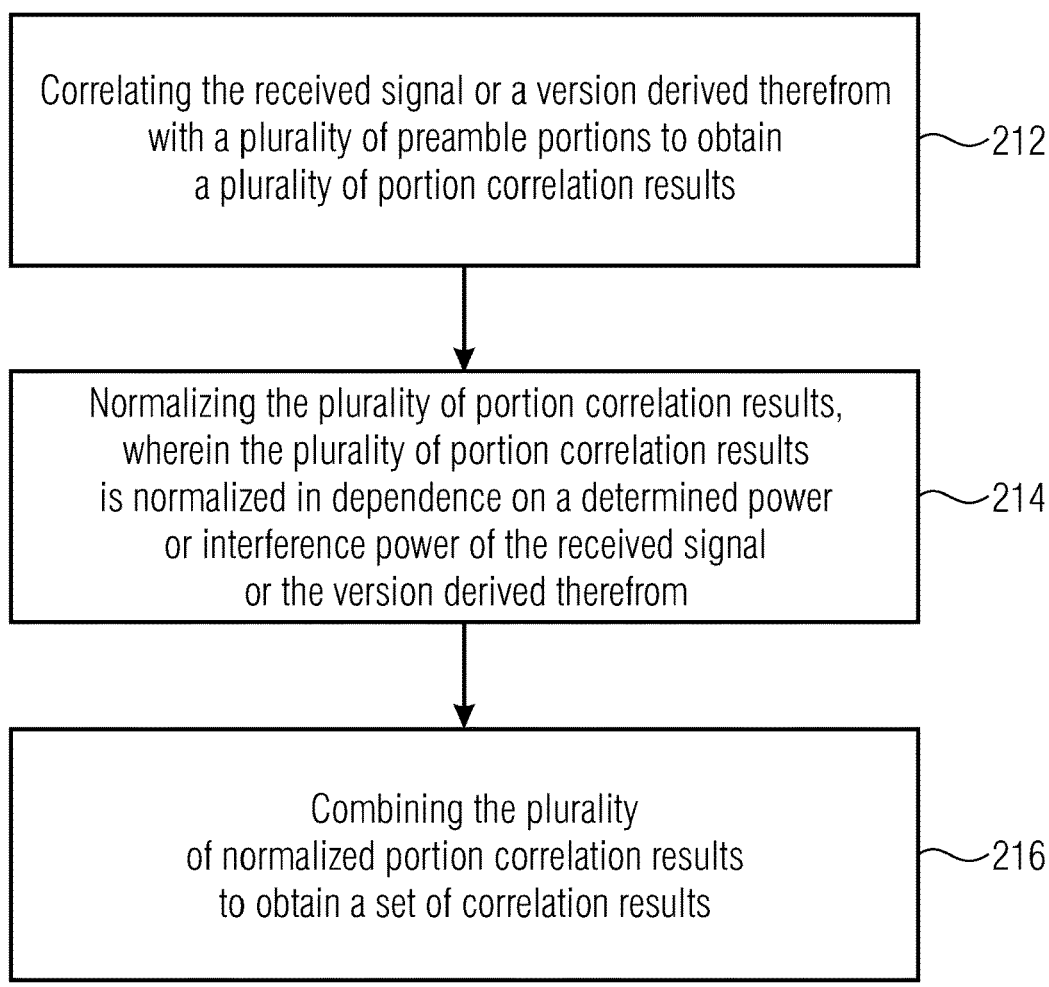
FIG. 25 is a flow diagram of a method for receiving a signal according to a further embodiment.

FIG. 25 shows a flow diagram of a method 210 for receiving a signal, wherein the signal comprises at least one data packet, wherein the data packet comprises a preamble. The method 210 includes a step 212 of correlating the received signal or a version derived therefrom [e.g. a filtered and/or stored version of the received signal] with a plurality of preamble portions [e.g. corresponding [e.g. matching (e.g. in an undisturbed transmission channel)] to different (e.g. overlapping or adjacent) portions of the preamble of the data packet] to obtain a plurality of portion correlation results [e.g. portion correlation amplitudes; e.g. one portion correlation result (e.g. one correlation amplitude) per preamble portion per sample]. Further, the method 210 includes a step 240 of normalizing the plurality of portion correlation results, wherein the plurality of portion correlation results is normalized in dependence on a determined [e.g. calculated] power or interference power (p[n]) of the received signal or the version derived therefrom [e.g. the filtered and/or stored version of the received signal]. Further, the method 210 comprises a step 216 of combining the plurality of normalized portion correlation results [e.g. per sample] [e.g. to add or incoherently add the same] to obtain a set of correlation results [e.g. (normalized) correlation amplitudes; e.g. for the received signal].

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

The apparatuses described herein may be implemented, for example, by using a hardware apparatus or by using a computer or by using a combination of a hardware apparatus and a computer.

The apparatuses described herein or any components of the apparatuses described herein may be implemented at least partly in hardware and/or software (computer program).

The methods described herein may be implemented, for example, by using a hardware apparatus or by using a computer or by using a combination of a hardware apparatus and a computer.

The methods described herein or any components of the methods described herein may be performed at least partly by hardware and/or by software.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015.
[2] DE 10 2011 082098 B4
[3] WO 2017/167366 A1
[4] DE 10 2017 206248 A1

The invention claimed is:
1. A data receiver configured to receive a signal comprising a plurality of partial data packets, wherein each of the plurality of partial data packets comprises part of a data packet, the data receiver comprising:
a multi-stage correlator configured to perform multi-stage correlation to detect the plurality of partial data packets in the received signal,
wherein a second correlation stage of the multi-stage correlator operates based on correlation results of a first correlation stage of the multi-stage correlator,
wherein the plurality of partial data packets are distributed in time and frequency according to a hopping pattern, and
wherein the multi-stage correlator is configured to detect the plurality of partial data packets in the received signal or in a signal derived from the received signal,
wherein at least two groups of partial data packets of the plurality of partial data packets comprise a same relative group hopping pattern in groups, and
wherein the second correlation stage is configured to select groups of correlation results based on a group correlation pattern derived from a group hopping pattern from a set of correlation results of the first correlation stage and to combine them in groups to acquire a set of correlation results of the second correlation stage.

2. The data receiver according to claim 1,
wherein the multi-stage correlator is configured to detect the plurality of partial data packets based on preambles of the plurality of partial data packets in the received signal.

3. The data receiver according to claim 2,
wherein the received signal comprises a plurality of subband signals, wherein the plurality of subband signals comprise different subbands of the received signal.

4. The data receiver according to claim 3,
wherein the plurality of subband signals are used directly for a correlation performed by the multi-stage correlator.

5. The data receiver according to claim 3,
wherein the multi-stage correlator is configured to perform multi-stage correlation of at least one subset of the plurality of subband signals to detect the plurality of partial data packets in the at least one subset of the plurality of subband signals.

6. The data receiver according to claim 3,
wherein the data receiver is configured to multiply the plurality of subband signals with at least one complex exponential oscillation to increase a frequency resolution in the multi- stage correlator.

7. The data receiver according to claim 6,
wherein the exponential oscillations are applied to reference symbols.

8. The data receiver according to claim 1,
wherein the first correlation stage of the multi-stage correlator is configured to correlate the received signal or the signal derived therefrom with a plurality of preamble portions that correspond to different portions of preambles of the plurality of partial data packets to acquire a plurality of portion correlation results, and
wherein the first correlation stage is configured to combine the plurality of portion correlation results to acquire a set of correlation results or a subset of correlation results as the correlation results of the first correlation stage.

9. The data receiver according to claim 8,
wherein the first correlation stage is configured to normalize the plurality of portion correlation results.

10. The data receiver according to claim 8,
wherein the first correlation stage is configured to normalize the plurality of portion correlation results in dependence on a determined power of the received signal or the signal derived therefrom.

11. The data receiver according to claim 10,
wherein the power for normalization is determined across several subbands.

12. The data receiver according to claim 10,
wherein the power for normalization is determined based on synchronization symbols and at least one data symbol of the respective partial data packets.

13. The data receiver according to claim 10,
wherein the first correlation stage is configured to normalize the portion correlation results separately, and wherein the power is determined separately for each preamble portion or together for all preamble portions.

14. The data receiver according to claim 8,
wherein the first correlation stage comprises a plurality of queue caches that are configured to cache the respective portion correlation results,
wherein the plurality of queue caches comprise different memory lengths, and
wherein the memory lengths of the plurality of queue caches depend on the respective preamble portions of the preambles of the plurality of partial data packets.

15. The data receiver according to claim 3,
wherein the first correlation stage is configured to correlate at least two subband signals of the plurality of subband signals, each with a plurality of preamble portions, to acquire a subset of correlation results for each subband signal of the at least two subband signals, and
wherein the first correlation stage is configured to provide a set of correlation results comprising the subsets of correlation results as correlation results of the first correlation stage.

16. The data receiver according to claim 15,
wherein the set of correlation results of the first correlation stage is a two-dimensional array of correlation results,
wherein a first dimension of the two-dimensional array of correlation results describes sampling instants of the received signal, and
wherein a second dimension of the two-dimensional array of correlation results describes subbands of a signal to be received.

17. The data receiver according to claim 8,
wherein the first correlation stage comprises an output queue cache that is configured to cache the set of correlation results of the first correlation stage.

18. The data receiver according to claim 8,
wherein the first correlation stage is configured to calculate a maximum across correlation results of adjacent subband signals and to discard smaller values.

19. The data receiver according to claim 8,
wherein the plurality of partial data packets comprise at least two different preambles,
wherein the first correlation stage is configured to correlate the received signal with a second plurality of preamble portions corresponding to different portions of a second preamble of the plurality of partial data packets to acquire at least a second plurality of portion correlation results, and
wherein the first correlation stage is configured to combine the second plurality of portion correlation results to acquire a second set of correlation results or a second subset of correlation results.

20. The data receiver according to claim 19,
wherein the at least two different preambles comprise different lengths.

21. The data receiver according to claim 1,
wherein the plurality of partial data packets comprise a same preamble.

22. The data receiver according to claim 1,
wherein the second correlation stage is configured to select the groups of correlation results from the set of correlation results of the first correlation stage in temporal and/or frequency direction based on the group correlation pattern.

23. The data receiver according to claim 1,
wherein the set of correlation results of the first correlation stage is a two-dimensional array of correlation results, and
wherein the group correlation pattern indicates time intervals and frequency spacings of the correlation results of the two-dimensional array of correlation results of the first correlation stage that correspond to relative time intervals and frequency spacings of the group hopping pattern of the groups of partial data packets.

24. The data receiver according to claim 1,
herein the set of correlation results of the second correlation stage is a two-dimensional array of correlation results,
wherein a first dimension of the two-dimensional array of correlation results describes a temporal position of a group of partial data packets, and
wherein a second dimension of the two-dimensional array of correlation results describes a frequency position of the group of partial data packets.

25. The data receiver according to claim 24,
wherein at least one dimension of the two-dimensional array of correlation results of the second correlation stage is smaller than the respective at least one dimension of the two-dimensional array of correlation results of the first correlation stage.

26. The data receiver according to claim 1,
wherein the second correlation stage comprises an output queue cache that is configured to cache the set of correlation results of the second correlation stage.

27. The data receiver according to claim 1,
wherein at least two further groups of partial data packets of the plurality of partial data packets comprise a same relative further group hopping pattern in groups,
wherein the second correlation stage is configured to select further groups of correlation results based on a further group correlation pattern derived from a further group hopping pattern from the set of correlation results of the first correlation stage and to combine them in groups to acquire a set of further correlation results of the second correlation stage, and
wherein the group hopping pattern and the further group hopping pattern are different.

28. The data receiver according to claim 1,
wherein the at least two groups of partial data packets form a sequence,
wherein the at least two groups of partial data packets comprise a relative group sequence hopping pattern to one another, and
wherein the data receiver comprises a third correlation stage that is configured to select groups of correlation results based on a group sequence correlation pattern derived from a group sequence hopping pattern from the set of correlation results of the second correlation stage and to combine them in groups to acquire a set of correlation results of the third correlation stage.

29. The data receiver according to claim 28,
wherein the third correlation stage is configured to select the groups of correlation results from the set of correlation results of the second correlation stage in temporal and/or frequency direction based on the group sequence correlation pattern.

30. The data receiver according to claim 28,
wherein the set of correlation results of the second correlation stage is a two-dimensional array of correlation results, and
wherein the group sequence correlation pattern indicates time intervals and frequency spacings of the correlation results of the two-dimensional array of correlation results of the second correlation stage that correspond to relative time intervals and frequency spacings of the group sequence hopping pattern.

31. The data receiver according to claim 28,
wherein the set of correlation results of the third correlation stage is a two-dimensional array of correlation results,
wherein a first dimension of the two-dimensional array of correlation results describes a temporal position of the groups of partial data packets,
wherein a second dimension of the two-dimensional array of correlation results describes a relative frequency position of the groups of partial data packets.

32. The data receiver according to claim 31,
wherein at least one dimension of the two-dimensional array of correlation results of the third correlation stage is smaller than the respective at least one dimension of the two-dimensional array of correlation results of the second correlation stage.

33. The data receiver according to claim 28,
wherein the third correlation stage comprises an output queue cache that is configured to cache the set of correlation results of the third correlation stage.

34. The data receiver according to claim 28,
wherein the data receiver is configured to transmit the set of correlation results in a suitable form to a subsequent packet detection.

35. The data receiver according to claim 28,
wherein the at least two groups of partial data packets form a further sequence,
wherein the at least two groups of partial data packets comprise a further group sequence hopping pattern relative to one another,
wherein the third correlation stage is configured to select groups of correlation results based on a further group sequence correlation pattern derived from a further group sequence hopping pattern from a set of correlation results of a further correlation stage and to combine them in groups to acquire a further set of correlation results of the third correlation stage, and
wherein the group sequence hopping pattern and the further group sequence hopping pattern are different.

36. A method for receiving a signal, wherein the signal comprises a plurality of partial data packets, wherein each of the plurality of partial data packets comprises part of a data packet, the method comprising:
performing multi-stage correlation to detect the plurality of partial data packets in the received signal,
wherein a second correlation stage of the multi-stage correlation is performed based on correlation results of a first correlation stage of the multi-stage correlation,
wherein the plurality of partial data packets are distributed in time and frequency according to a hopping pattern,
wherein during the multi-stage correlation, the plurality of partial data packets are detected in the received signal or in a signal derived from the received signal,
wherein at least two groups of partial data packets of the plurality of partial data packets comprise a same relative group hopping pattern in groups, and
wherein the second correlation stage of the multi-stage correlation is performed by selecting groups of correlation results based on a group correlation pattern derived from a group hopping pattern from a set of correlation results of the first correlation stage and combining them in groups to acquire a set of correlation results of the second correlation stage.

37. A non-transitory digital storage medium having a computer program stored thereon to perform, when the computer program is run by a computer, a method for receiving a signal, wherein the signal comprises a plurality of partial data packets, wherein each of the plurality of partial data packets comprises part of a data packet, the method comprising:
performing multi-stage correlation to detect the plurality of partial data packets in the received signal,
wherein a second correlation stage of the multi-stage correlation is performed based on correlation results of a first correlation stage of the multi-stage correlation,
wherein the plurality of partial data packets are distributed in time and frequency according to a hopping pattern, and
wherein during the multi-stage correlation, the plurality of partial data packets are detected in the received signal or in a signal derived from the received signal,
wherein at least two groups of partial data packets of the plurality of partial data packets comprise a same relative group hopping pattern in groups, and
wherein the second correlation stage of the multi-stage correlation is performed by selecting groups of correlation results based on a group correlation pattern derived from a group hopping pattern from a set of correlation results of the first correlation stage and combining them in groups to acquire a set of correlation results of the second correlation stage.

\* \* \* \* \*